(12) United States Patent
Takao et al.

(10) Patent No.: US 8,902,277 B2
(45) Date of Patent: Dec. 2, 2014

(54) COMMUNICATION DEVICE, COMMUNICATION METHOD THEREFOR, AND COMMUNICATION PROGRAM THEREFOR

(75) Inventors: Naoya Takao, Hyogo (JP); Kazuo Fujimoto, Osaka (JP); Shigeaki Watanabe, Kyoto (JP); Masafumi Kouzuki, Osaka (JP); Masaki Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 486 days.

(21) Appl. No.: 13/326,830

(22) Filed: Dec. 15, 2011

(65) Prior Publication Data

US 2012/0154512 A1 Jun. 21, 2012

Related U.S. Application Data

(60) Provisional application No. 61/434,876, filed on Jan. 21, 2011, provisional application No. 61/427,564, filed on Dec. 28, 2010.

(30) Foreign Application Priority Data

Dec. 15, 2010 (JP) .................................. 2010-278788

(51) Int. Cl.
*H04N 7/14* (2006.01)
*H04W 52/02* (2009.01)

(52) U.S. Cl.
CPC .............. *H04N 7/142* (2013.01); *H04N 7/147* (2013.01); *H04W 52/0229* (2013.01); *H04W 52/028* (2013.01)
USPC .................. 348/14.05; 348/14.03; 348/14.04; 455/556.1

(58) Field of Classification Search
USPC .................. 348/14.01–14.16; 370/259–271, 370/351–357; 455/412.1–426.2, 455/456.1–466, 550.1–560, 575.1–575.9, 455/90.1–90.3; 709/201–207, 217–248
See application file for complete search history.

(56) References Cited

U.S. PATENT DOCUMENTS 5,920,693 A * 7/1999 Burkman et al. ............. 709/204
6,789,120 B1 * 9/2004 Lee et al. ...................... 709/227
(Continued)

FOREIGN PATENT DOCUMENTS

JP          06-125551       5/1994
JP          2002-077841     3/2002
(Continued)

OTHER PUBLICATIONS

U.S. Appl. No. 13/116,371 to Naoya Takao et al., filed May 26, 2011.
(Continued)

*Primary Examiner* — Hemant Patel
(74) *Attorney, Agent, or Firm* — Greenblum & Bernstein, P.L.C.

(57) ABSTRACT

A first index corresponding to a first conversation operation and a second index corresponding to a second conversation operation are selectably displayed on a screen of a video output device. When a communicator receives a conversation request from another device, a controller determines whether the first index or the second index is selected on the screen or whether an operating member is operated. If the first index is selected, the controller performs the first conversation operation. If the second index is selected, the controller performs the second conversation operation. If the operating member is operated, the controller performs the second conversation operation.

13 Claims, 16 Drawing Sheets

(56) References Cited

U.S. PATENT DOCUMENTS

| | | |
|---|---|---|
| 7,050,553 B2 * | 5/2006 | Chang et al. .............. 379/93.15 |
| 2002/0015091 A1 * | 2/2002 | Honguu et al. ............ 348/14.06 |
| 2002/0080943 A1 * | 6/2002 | Jin et al. .................. 379/201.01 |
| 2005/0143053 A1 * | 6/2005 | Virtanen et al. ........... 455/414.1 |
| 2006/0029050 A1 * | 2/2006 | Harris et al. ................. 370/356 |
| 2006/0038019 A1 | 2/2006 | Kajiwara et al. |
| 2007/0195158 A1 * | 8/2007 | Kies .......................... 348/14.01 |
| 2008/0037513 A1 * | 2/2008 | Gerding et al. .............. 370/352 |
| 2008/0225750 A1 | 9/2008 | Jefremov |
| 2008/0225844 A1 | 9/2008 | Jefremov |
| 2009/0234919 A1 | 9/2009 | Jefremov et al. |
| 2010/0060715 A1 * | 3/2010 | Laasik et al. .............. 348/14.04 |
| 2011/0122869 A1 | 5/2011 | Jefremov |
| 2011/0242268 A1 * | 10/2011 | Kim et al. ................. 348/14.04 |

FOREIGN PATENT DOCUMENTS

| | | |
|---|---|---|
| JP | 2006-60396 | 3/2006 |
| JP | 2010-521856 | 6/2010 |
| WO | 2008/110871 | 9/2008 |
| WO | 2008/110930 | 9/2008 |
| WO | 2009/112547 | 9/2009 |

OTHER PUBLICATIONS

U.S. Appl. No. 13/324,342 to Masafumi Kouzuki et al., filed Dec. 13, 2011.

U.S. Appl. No. 13/326,790 to Naoya Takao et al., filed Dec. 15, 2011.

* cited by examiner

F I G. 3
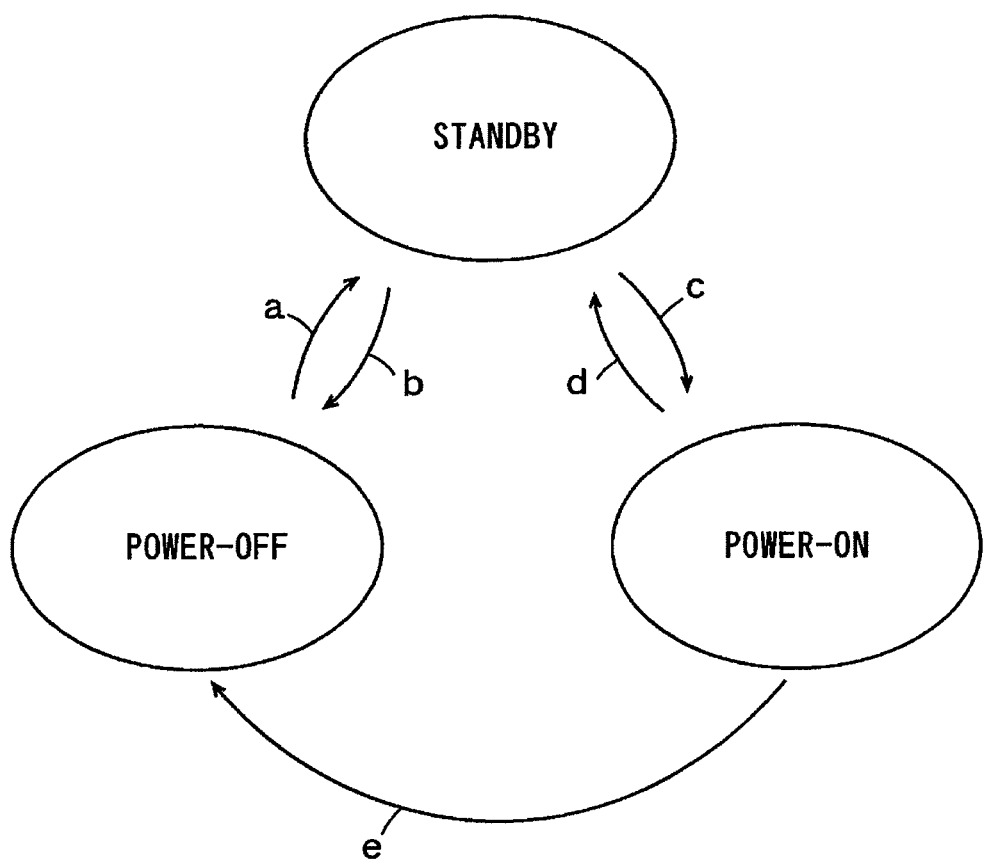

FIG. 4

[START CONDITION OF CONVERSATION PROGRAM]

| STATE \ CONDITION | · AUTOMATIC SIGNING-IN "YES"<br>· INCOMING CALL PERMISSION AT STANDBY TIME "NO" | · AUTOMATIC SIGNING-IN "YES"<br>· INCOMING CALL PERMISSION AT STANDBY TIME "YES" |
|---|---|---|
| POWER-OFF (PHYSICALLY TURN OFF POWER) | × | × |
| STANDBY (START CONTROL LSI) | × | ○ |
| POWER-ON | ○ | ○ |

COMMUNICATION DEVICE, COMMUNICATION METHOD THEREFOR, AND COMMUNICATION PROGRAM THEREFOR

CROSS-REFERENCE TO RELATED APPLICATIONS

This application claims the benefit of U.S. Provisional Application Nos. 61/427,564, filed Dec. 28, 2010, and 61/434,876, filed Jan. 21, 2011, the disclosures of which, including the specification, drawings, and claims, are incorporated herein by reference in their entireties.

BACKGROUND OF THE INVENTION (1) Field of the Invention

The present invention relates to a communication device capable of transmitting and receiving video data as well as audio data, a communication method therefor, and a communication program therefor.

(2) Description of Related Art

In a communication system and a data communication method discussed in JP 2010-521856 A, communication is performed between a first terminal and a second terminal via a network. In the communication system, each of the first and second terminals includes a receiving circuit and a transmitting circuit. Each of the first and second terminals includes a web camera and a microphone as input devices, and includes a display screen and a loudspeaker as output devices.

For example, in the first terminal, video of a user of the first terminal is input to the web camera, and audio of the user of the first terminal is input to the microphone. In the second terminal, video of a user of the second terminal is input to the web camera, and audio of the user of the second terminal is input to the microphone.

In the transmitting circuit in the first terminal, data based on the video and the audio input to the web camera and the microphone is transmitted to the second terminal via the network. In this case, the data transmitted from the first terminal via the network is received in the receiving circuit in the second terminal, and video and audio based on the received data are output from the display screen and the loudspeaker.

Similarly, in the transmitting circuit in the second terminal, data based on the video and the audio input to the web camera and the microphone is transmitted to the first terminal via the network. In this case, the data transmitted from the second terminal via the network is received in the receiving circuit in the first terminal, and video and audio based on the received data are output from the display screen and the loudspeaker.

Thus, the user of the first terminal can talk with the user of the second terminal while visually recognizing the video of the user of the second terminal. Similarly, the user of the second terminal can talk with the user of the first terminal while visually recognizing the video of the user of the first terminal.

BRIEF SUMMARY OF THE INVENTION

In the above-mentioned communication system, when a user of a first terminal talks with a user of a second terminal, the user of the first terminal transmits a conversation request to the second terminal. The user of the second terminal transmits a response signal to the first terminal by a predetermined operation when the user receives the conversation request. Thus, the user of the first terminal and the user of the second terminal can talk with each other.

However, the communication system discussed in JP 2010-521856 A does not discuss what operation is performed for the user of the second terminal to start to talk with the user of the first terminal when the second terminal receives the conversation request.

The present invention is directed to providing a communication device enabling a user to start to talk with a user of another device in a desired method depending on the situation, a communication method therefor, and a communication program therefor.

According to an aspect of the present invention, a communication device configured to be capable of communicating with another device and be operable using an operating member by a user while being connectable to a video output device includes a communicator configured to be capable of transmitting video data and audio data to the other device and be capable of receiving video data, audio data, and a conversation request transmitted from the other device, and a controller configured to selectively perform a first conversation operation for transmitting audio data and video data to the other device by the communicator and a second conversation operation for transmitting audio data to the other device by the communicator and not transmitting video data to the other device while being configured to selectably display a first index corresponding to the first conversation operation and a second index corresponding to the second conversation operation on a screen of the video output device, in which the controller is configured to determine whether the first index or the second index is selected on the screen and whether the operating member is operated when the communicator receives a conversation request from the other device, and perform the first conversation operation when the first index is selected, perform the second conversation operation when the second index is selected, and perform the second conversation operation when the operating member is operated.

According to another aspect of the present invention, a communication device configured to be capable of communicating with another device and be operable using an operating member by a user while being connectable to a video output device includes a main functional unit configured to perform a main functional operation based on video data and audio data, a communicator configured to be capable of transmitting video data and audio data to the other device and receiving video data, audio data, and a conversation request transmitted from the other device, a controller configured to control the main functional unit while controlling communication of video data and audio data by the communicator, a power supplier configured to be capable of supplying power to the controller and the main functional unit, a switcher configured to switch the communication device to a power-on state where power is supplied to the controller and the main functional unit from the power supplier and a standby state where power is supplied to the controller from the power supplier and power is not supplied to the main functional unit, and a controller configured to selectively perform a first conversation operation for transmitting audio data and video data to the other device by the communicator and a second conversation operation for transmitting audio data to the other device by the communicator and not transmitting video data to the other device while being configured to selectably display a first index corresponding to the first conversation operation and a second index corresponding to the second conversation operation on a screen of the video output device, in which the controller is configured to determine whether the communication device is in the power-on state or the standby state, determine whether the first index or the second index is selected on the screen when the communication device is in the power-on state and the communicator receives a conversation request from the other device, perform the first conversation operation when the first index is selected, perform the second conversation operation when the second index is selected, determine whether the operating member is operated when the communication device is in the standby state and the communicator receives a conversation request from the other device, and perform the second conversation operation when the operating member is operated.

According to still another aspect of the present invention, a communication method for a communication device configured to be capable of communicating with another device and be operable using an operating member by a user while being connectable to a video output device includes the steps of receiving a conversation request from the other device by a communicator, selectably displaying a first index corresponding to a first conversation operation for transmitting audio data and video data to the other device and a second index corresponding to a second conversation operation for transmitting audio data to the other device and not transmitting video data to the other device on a screen of the video output device, determining whether the first index or the second index is selected on the screen and whether the operating member is operated when the conversation request is received, and performing the first conversation operation when the first index is selected, performing the second conversation operation when the second index is selected, and performing the second conversation operation when the operating member is operated.

According to yet still another aspect of the present invention, a communication method for a communication device configured to be capable of communicating with another device and be operable using an operating member by a user while being connectable to a video output device, in which the communication device is configured to be switchable to a power-on state where power is supplied to a controller and a main functional unit and a standby state where power is supplied to the controller and power is not supplied to the main functional unit, includes the steps of performing a main functional operation based on video data and audio data by the main functional unit according to control by the controller when the communication device is in the power-on state, receiving a conversation request from the other device, selectably displaying a first index corresponding to a first conversation operation for transmitting audio data and video data to the other device and a second index corresponding to a second conversation operation for transmitting audio data to the other device and not transmitting video data to the other device on a screen of the video output device, determining whether the communication device is in the power-on state or the standby state, determining whether the first index or the second index is selected on the screen when the communication device is in the power-on state and the communicator receives the conversation request from the other device, performing the first conversation operation when the first index is selected, and performing the second conversation operation when the second index is selected, determining whether the operating member is operated when the communication device is in the standby state and the communicator receives the conversation request from the other device, and performing the second conversation operation when the operating member is operated.

According to a further aspect of the present invention, a communication program executable by a controller in a communication device configured to be capable of communicating with another device and be operable using an operating member by a user while being connectable to a video output device causes the controller to perform processing for controlling a communicator to receive a conversation request from the other device, processing for selectably displaying a first index corresponding to a first conversation operation for transmitting audio data and video data to the other device and a second index corresponding to a second conversation operation for transmitting audio data to the other device and not transmitting video data to the other device on a screen of the video output device, processing for determining whether the first index or the second index is selected on the screen and whether the operating member is operated when the conversation request is received, and processing for performing the first conversation operation when the first index is selected, performing the second conversation operation when the second index is selected, and perform the second conversation operation when the operating member is operated.

According to a still further aspect of the present invention, a communication program executable by a controller in a communication device configured to be capable of communicating with another device and be operable using an operating member by a user while being connectable to a video output device, in which the communication device is configured to be switchable to a power-on state where power is supplied to the controller and a main functional unit and a standby state where power is supplied to the controller and power is not supplied to the main functional unit, causes the controller to perform processing for controlling the main functional unit to perform a main functional operation based on video data and audio data when the communication device is in the power-on state, processing for controlling a communicator to receive a conversation request from the other device, processing for selectably displaying a first index corresponding to a first conversation operation for transmitting audio data and video data to the other device and a second index corresponding to a second conversation operation for transmitting audio data to the other device and not transmitting video data to the other device on a screen of the video output device, processing for determining whether the communication device is in the power-on state or the standby state, processing for determining whether the first index or the second index is selected on the screen when the communication device is in the power-on state and the communicator receives the conversation request from the other device, processing for performing the first conversation operation when the first index is selected, and performing the second conversation operation when the second index is selected, processing for determining whether the operating member is operated when the communication device is in the standby state and the communicator receives the conversation request from the other device, and processing for performing the second conversation operation when the operating member is operated.

According to the present invention, the user can start a conversation using both video and audio or a conversation using only audio in a desired method depending on the situation. As a result, convenience for the user is improved.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 3 is a schematic view illustrating a state transition of a communication device;

FIG. 4 illustrates an example of a start condition of a conversation program;

DESCRIPTION OF THE PREFERRED EMBODIMENTS

A communication device according to an embodiment of the present invention, a communication method therefor, and a communication program therefor will be described with reference to the drawings.

[1] Outline of Communication System

Figure 1:
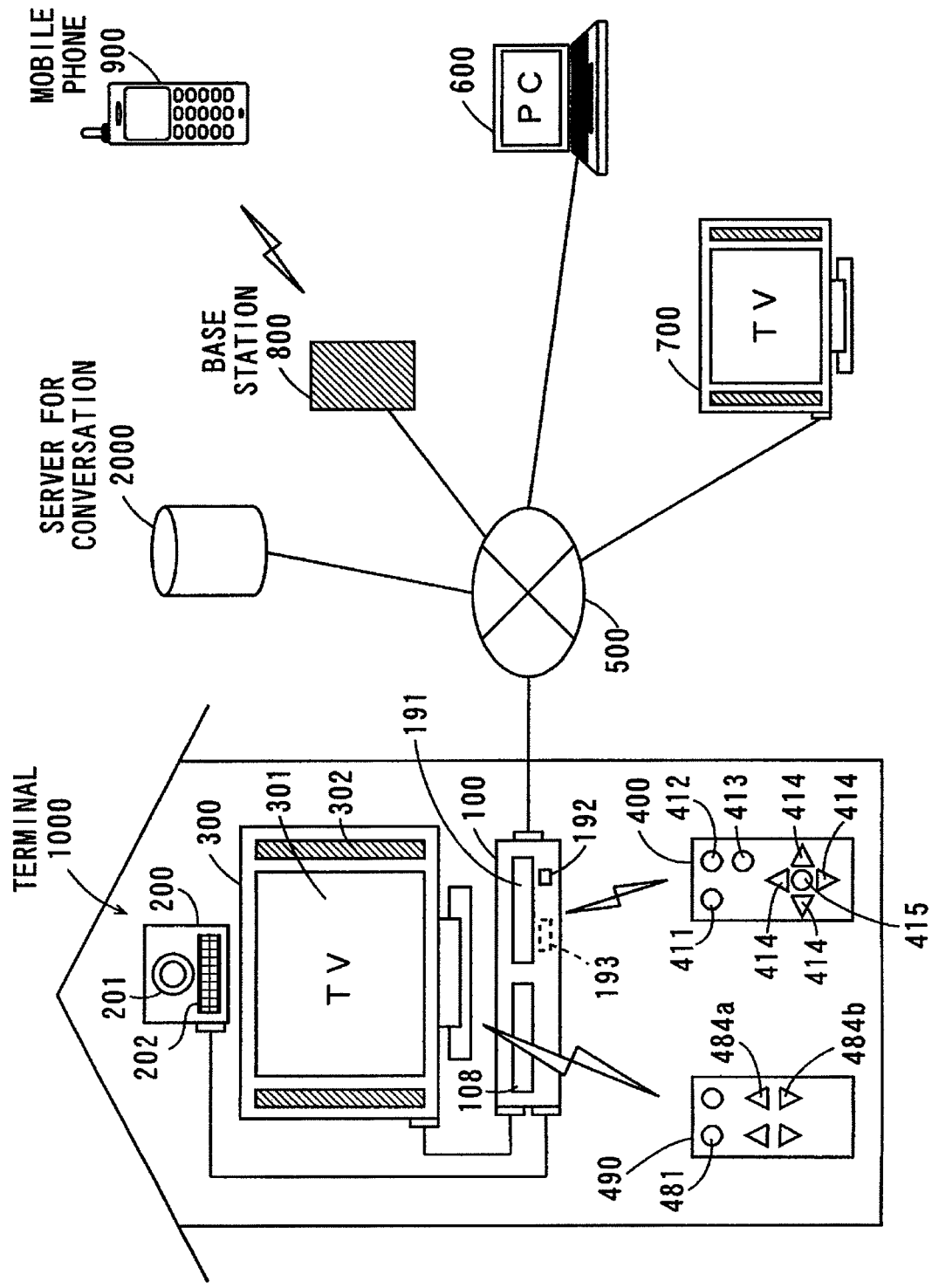
FIG. 1 illustrates an outline of a communication system according to an embodiment of the present invention.
Figure 2:
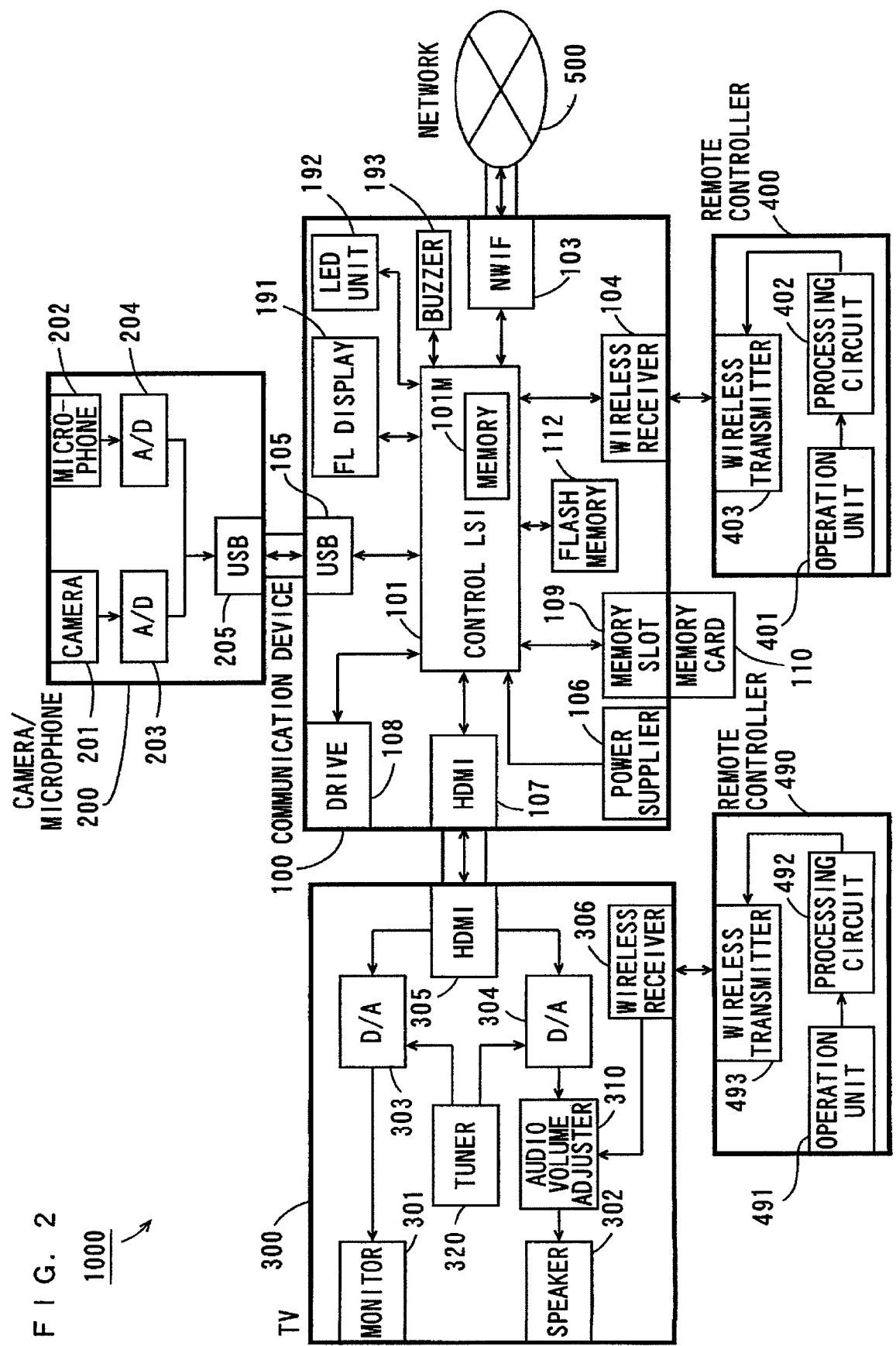
FIG. 2 is a block diagram illustrating a configuration of a terminal illustrated in FIG. 1.

FIG. 1 illustrates an outline of a communication system according to an embodiment of the present invention, and FIG. 2 is a block diagram illustrating a configuration of a terminal 1000 illustrated in FIG. 1.

As illustrated in FIG. 1, the terminal 1000, a base station 800, a personal computer 600, a television receiver (hereinafter abbreviated as a television) 700, and a server for conversation 2000 are connected to a network 500 in the communication system. A mobile phone 900 is connected to the network 500 via the base station 800. In this manner, the terminal 1000, the personal computer 600, the television 700, and the mobile phone 900 are connected as a plurality of communication terminals to the network 500. The network 500 is the interm in the present embodiment.

In an example illustrated in FIG. 1, a control large-scale integrated circuit (LSI) 101 (FIG. 2), described below, is incorporated in each of the plurality of communication terminals (the terminal 1000, the personal computer 600, the television 700, and the mobile phone 900) connected to one another. A conversation program, described below, is stored in a memory of the incorporated control LSI 101 (FIG. 2).

Each of the communication terminals includes a video input unit, an audio input unit, a video output unit, and an audio output unit. The video input unit includes a camera, for example. The audio input unit includes a microphone, for example. The video output unit includes a monitor, for example. The audio output unit includes a speaker, for example.

In the present embodiment, users of the plurality of communication terminals are required to previously register their own unique user information in the server for conversation 2000. The user information includes a user identifier (hereinafter referred to as a user ID) and a password associated with the user ID.

The server for conversation 2000 manages a plurality of users by storing a plurality of user information of the plurality of users.

New user information, together with a request to register the user information, is transmitted from any of the communication terminals to the server for conversation 2000 when registered.

The server for conversation 2000 determines whether a user ID of the received user information matches any of user IDs of the plurality of user information that have already been registered while referring to the plurality of user information that have already been stored.

When the user ID of the received user information does not match any of the user IDs of the plurality of user information that have already been registered, the server for conversation 2000 stores the fed user information. On the other hand, when the user ID of the received user information matches any of the user IDs of the plurality of user information that have already been registered, the server for conversation 2000 does not store the received user information. This prevents the plurality of user information including the same user ID from being registered in the server for conversation 2000.

A sign-in request, together with the user information, is transmitted from the one communication terminal, for example, to the server for conversation 2000. In this case, the server for conversation 2000 determines whether the received user information matches any of the plurality of user information that have been stored. More specifically, the server for conversation 2000 determines whether the user information received from the one communication terminal has already been registered.

When the received user information has already been registered, the server for conversation 2000 determines whether the signing-in using the same user information as the received user information is currently performed to prevent the plurality of users from signing in using the same user information.

When the signing-in using the same user information as the received user information is not performed, the server for conversation 2000 permits the user to sign in. On the other hand, when the user information received from the one communication terminal is not registered and when the signing-in using the same user information as the received user information is currently performed, the server for conversation 2000 does not permit the user to sign in.

The user signs in to the server for conversation 2000 so that an address (e.g., an internet protocol address) of the communication terminal is transmitted from the communication terminal used by the user to the server for conversation 2000. A request to continue the signing-in is transmitted from the communication terminal to the server for conversation 2000 in a predetermined period.

Thus, the user who currently signs in and the address of the communication terminal used by the user who signs in are managed in the server for conversation 2000.

The user signs in to the server for conversation 2000 using the one communication terminal so that a conversation request with the other user, together with a user ID of the other user, is transmitted to the server for conversation 2000. In this case, the server for conversation 2000 determines whether the other user has signed in based on the received user ID.

When the other user has signed in, the server for conversation 2000 transmits the address of the communication terminal used by the other user to the one communication terminal. Thus, the one communication terminal accesses the other communication terminal using the received address. This enables various types of data including video data and audio data to be communicated between the one communication terminal and the other communication terminal.

On the other hand, when the other user has not signed in, the server for conversation 2000 transmits information indicating that the other user has not signed in to the one communication terminal. In this case, information indicating that a conversation with the other user is not possible is presented to the user with a monitor or a speaker in the one communication terminal.

Further, the user can accept an access from the other communication terminal by signing in to the server for conversation 2000 using the one communication terminal.

Communication of the video data based on video of each of the users captured by the camera and the audio data based on audio of each of the users input to the microphone is performed among the plurality of communication terminals. This allows the user of each of the communication terminals to talk with the user of the other communication terminal.

A configuration of the terminal 1000 will be described below. As illustrated in FIGS. 1 and 2, the terminal 1000 includes a communication device 100, a camera/microphone device 200, a television 300, and two remote controllers 400 and 490.

As illustrated in FIG. 2, the communication device 100 includes the control LSI 101, a network interface 103, a wireless receiver 104, a universal serial bus (hereinafter referred to as a USB) interface 105, a power supplier 106, a high-definition multimedia interface (hereinafter referred to as an HDMI) 107, an optical disk drive 108, a memory slot 109, a fluorescent display tube (hereinafter referred to as an FL display) 191, a light emitting diode unit (hereinafter referred to as an LED unit) 192, a buzzer 193, and a flash memory 112. A memory card 110 is inserted into the memory slot 109. The network interface 103 in the communication device 100 is connected to the network 500 via a network cable (e.g., a local area network cable) in the present embodiment.

The control LSI 101 includes a central processing unit (CPU) and a memory 101M, and is implemented by an integrated circuit using semiconductors. As described above, a conversation program, described below, together with a system program for the communication device 100, is stored in the memory 101M of the control LSI 101. The CPU executes each program stored in the memory 101M so that the control LSI 101 performs various types of processing. The control LSI 101 controls an operation of each of constituent elements in the communication device 100 while controlling communication with the other communication terminals (the personal computer 600, the television 700, the mobile phone 900, etc. illustrated in FIG. 1). A detailed configuration of the control LSI 101 will be described below.

The network interface 103 is connected to the network 500 via the network cable. The network interface 103 causes various types of data including the video data and the audio data to be fed from the network 500 to the control LSI 101 in the communication device 100. Various types of data including the video data and the audio data are also fed from the control LSI 101 in the communication device 100 to the network 500.

The remote controller 400 transmits an operation signal, described below, to the communication device 100 by wireless communication (e.g., infrared communication), as described below. The wireless receiver 104 receives the operation signal wirelessly transmitted from the remote controller 400. The operation signal, which has been received by the wireless receiver 104, is fed to the control LSI 101.

The USB interface 105 is connected to the camera/microphone device 200 via a USB cable. The power supplier 106 includes a power supply circuit for converting alternating current (AC) power to direct current (DC) power. A power supply plug is connected to the power supply circuit. The power supply plug is connectable to a household electrical outlet. The power supplier 106 supplies electric power obtained from the household electrical outlet to each of the constituent elements in the communication device 100. The HDMI 107 is connected to the television 300 via an HDMI cable. The optical disk drive 108 reads and writes data to and from an optical disk.

The memory slot 109 is configured so that the memory card 110 can be inserted thereinto and ejected therefrom. With the memory card 110 inserted into the memory slot 109, the control LSI 101 can read data stored in the memory card 110. The control LSI 101 can write data into the memory card 110.

The flash memory 112 is connected to the control LSI 101. The flash memory 112 may be replaced with another nonvolatile memory. The flash memory 112 stores the user information of the user who uses the terminal 1000 and a list of user IDs of the other users (hereinafter referred to as a contact list), for example. The flash memory 112 stores, when the user cannot accept accesses from the other communication terminals, data (e.g., video data and audio data for notifying that the user is absent) that is to be fed to the other communication terminals in response to the accesses from the other communication terminals.

The communication device 100 has a box-shaped casing, for example. The control LSI 101, the network interface 103, the wireless receiver 104, the USB interface 105, the power supplier 106, the HDMI 107, the optical disk drive 108, and the memory slot 109 are accommodated in the casing. The FL display 191, the LED unit 192, and the buzzer 193 are attached to the casing.

The FL display 191 is composed of a fluorescent display tube of seven segments or a fluorescent display tube of fourteen segments, for example. Information representing current time, reproduction time of the optical disk, and so on are fed from the control LSI 101 to the FL display 191. The FL display 191 displays the fed information.

The LED unit 192 generates monochromatic light. Information representing lighting or non-lighting is fed from the control LSI 101 to the LED unit 192. The LED unit 192 lights up, goes out, or flashes based on the information fed from the control LSI 101.

Information for instructing the buzzer 193 to generate an alarm is fed from the control LSI 101. In this case, the buzzer 193 generates an alarm sound based on the information fed from the control LSI 101.

The remote controller 400 includes an operation unit 401, a processing circuit 402, and a wireless transmitter 403. The operation unit 401 includes a power supply button 411, a conversation start button 412, a conversation response button 413, a cross key 414, and a determination button 415 illustrated in FIG. 1, and a plurality of number buttons (not illustrated). The cross key 414 includes an upper button, a lower button, a left button, and a right button. The user operates any of the buttons in the operation unit 401. The processing circuit 402 generates an operation signal according to the operated button. The generated operation signal is transmitted from the wireless transmitter 403 to the wireless receiver 104 in the communication device 100. As described above, wireless communication between the communication device 100 and the remote controller 400 is implemented by infrared communication, for example.

The camera/microphone device 200 includes a camera 201, a microphone 202, two analog/digital (hereinafter referred to as A/D) converters 203 and 204, and a USB interface 205. The USB interface 205 in the camera/microphone device 200 is connected to the USB interface 105 in the communication device 100 via the USB cable.

The camera 201 includes an image sensor. The image sensor acquires video of an object. In the camera 201, a video signal in an analog format is generated based on the acquired video. The A/D converter 203 converts the generated video signal to video data in a digital format. The video data in a digital format is fed to the control LSI 101 in the communication device 100 via the USB interface 205, the USB cable, and the USB interface 105.

Audio (a sound wave) is input to the microphone 202 from outside. In the microphone 202, an audio signal in an analog format is generated based on the input audio. The A/D converter 204 converts the generated audio signal to audio data in a digital format. The audio data in a digital format is fed to the control LSI 101 in the communication device 100 via the USB interface 205, the USB cable, and the USB interface 105.

The camera/microphone device 200 is used to acquire video and audio of the user, for example, in the present embodiment.

As described above, the camera/microphone device 200 includes the camera 201 and the microphone 202. The camera 201 and the microphone 202 may individually be connected to the communication device 100 instead of the camera/microphone device 200 being connected to the communication device 100.

The television 300 includes a monitor 301, a speaker 302, digital/analog (hereinafter referred to as D/A) converters 303 and 304, an HDMI 305, a wireless receiver 306, an audio volume adjuster 310, and a tuner 320. The HDMI 305 in the television 300 is connected to the HDMI 107 in the communication device 100 via the HDMI cable in the present embodiment.

The video data and the audio data in a digital format are fed from the control LSI 101 in the communication device 100 to the television 300 via the HDMI 107, the HDMI cable, and the HDMI 305. The D/A converter 303 converts the video data fed to the television 300 to a video signal in an analog format. The video signal in an analog format is fed to the monitor 301. Thus, video is displayed on the monitor 301.

On the other hand, the D/A converter 304 converts the audio data fed to the television 300 to an audio signal in an analog format. The audio signal in an analog format is fed to the audio volume adjuster 310.

An operation signal for adjusting the level of the audio signal, for example, is input from the remote controller 490, described below, to the audio volume adjuster 310. Thus, the audio volume adjuster 310 adjusts the level of the audio signal based on the operation signal fed from the remote controller 490. The adjusted audio signal is fed to the speaker 302, and audio based on the audio signal is output.

The tuner 320 receives, selects, demodulates, and decodes a broadcast signal for a program to be broadcast or distributed, to generate video data and audio data, and feeds the generated video data and audio data to the D/A converter 303 and the D/A converter 304, respectively. Thus, video of the program is displayed on the monitor 301, and audio of the program is output from the speaker 302.

As described above, the communication device 100 and the television 300 are connected to each other via the HDMI 107, the HDMI cable, and the HDMI 305. In this case, the communication device 100 can feed a control signal for controlling an operation of the television 300 to the television 300.

The monitor 301 and the speaker 302 may individually be connected to the communication device 100 instead of the television 300 being connected to the communication device 100.

The remote controller 490 includes an operation unit 491, a processing circuit 492, and a wireless transmitter 493. The operation unit 491 includes a power supply button 481 and audio volume adjustment buttons 484a and 484b illustrated in FIG. 1. The user operates any of the buttons in the operation unit 491. The processing circuit 492 generates an operation signal according to the operated button.

The power supply button 481 is operated so that an operation signal for turning on power to the television 300 is generated. The audio volume adjustment button 484a is operated so that an operation signal for increasing the level of the audio signal is generated. The audio volume adjustment button 484b is operated so that an operation signal for decreasing the level of the audio signal is generated.

The generated operation signal is wirelessly transmitted from the wireless transmitter 493 to the wireless receiver 306 in the television 300. Wireless communication between the television 300 and the remote controller 490 is implemented by infrared communication, for example.

In the terminal 1000, the video data and the audio data are fed from the camera/microphone device 200 to the communication device 100, for example. In the communication device 100, the fed video data is encoded, and the fed audio data is encoded. During a conversation operation in the terminal 1000, described below, the communication device 100 transmits the encoded video data and audio data to the other communication terminals (the personal computer 600, the television 700, and the mobile phone 900) connected to the network 500.

The user signs in to the server for conversation 2000 illustrated in FIG. 1 so that the communication device 100 receives video data and audio data transmitted from the other communication terminals connected to the network 500 in the terminal 1000. In the communication device 100, the received video data and audio data are decoded. During the conversation operation in the terminal 1000, described below, the communication device 100 feeds the decoded video data and audio data to the television 300. In the television 300, the video data in a digital format is converted to the video signal after the conversion in an analog format, and the video based on the video signal after the conversion is displayed on the monitor 301. The audio data in a digital format is converted to the audio signal in an analog format, and the audio based on the audio signal after the conversion is output from the speaker 302.

This causes communication of the video data and the audio data to be performed between the terminal 1000 and the other communication terminals, as described above. Similarly to the terminal 1000, each of the plurality of communication terminals connected to the network 500 includes a camera, a microphone, a monitor, and a speaker. This enables the user who uses the terminal 1000 to talk with users who use the other communication terminals.

In the communication device 100 in the terminal 1000, the video data and the audio data, which have been read from the optical disk by the optical disk drive 108, for example, are fed to the television 300. In the television 300, the video data in a digital format is converted to a video signal in an analog format, and video based on the video signal after the conversion is displayed on the monitor 301. The audio data in a digital format is converted to an audio signal in an analog format, and audio based on the audio signal after the conversion is output from the speaker 302.

Furthermore, video data and audio data, which have been received from the network 500, for example, are written into the memory card 110 in the communication device 100 in the terminal 1000.

[2] State Transition of Communication Device 100

FIG. 3 is a schematic view illustrating a state transition of the communication device 100. As illustrated in FIG. 3, the communication device 100 transits among at least three states. The three states include a power-off state, a standby state, and a power-on state.

The power-off state means a state where supply of electric power from the power supplier 106 to the control LSI 101 and the other constituent element in the communication device 100. If the power supply plug in the power supplier 106 is disconnected from the household electrical outlet, for example, the communication device 100 is in the power-off state. When the power supply plug in the power supplier 106 is connected to the household electrical outlet in the power-off state, the communication device 100 transits from the power-off state to the standby state, as indicated by an arrow a.

The standby state means a state where electric power is supplied to a control functional unit in the communication device 100 and electric power is not supplied to a main functional unit in the communication device 100. In the standby state, the main functional unit in the communication device 100 is stopped. In the present embodiment, the main functional unit is the optical disk drive 108, and has a function of recording and reproducing video data and audio data. The control functional unit includes the control LSI 101, the wireless receiver 104, the FL display 191, the LED unit 192, and the buzzer 193. In the standby state in the present embodiment, electric power is supplied from the power supplier 106 to at least the control LSI 101, the wireless receiver 104, the FL display 191, the LED unit 192, and the buzzer 193, and the function of the optical disk drive 108 is stopped. In this case, at least a part of the conversation program is executable. When the power supply button 411 in the remote controller 400 is operated in the standby state, the communication device 100 transits from the standby state to the power-on state, as indicated by an arrow c.

The power-on state means a state where electric power is supplied to the control functional unit and the main functional unit in the communication device 100. In the power-on state in the present embodiment, electric power is supplied from the power supplier 106 to the control LSI 101, the wireless receiver 104, the optical disk drive 108, the FL display 191, the LED unit 192, and the buzzer 193. In this case, the conversation program is being executed. When the power supply button 411 in the remote controller 400 is operated in the power-on state, the communication device 100 transits from the power-on state to the standby state, as indicated by an arrow d. When the power supply plug in the power supplier 106 is disconnected from the household electrical outlet in the power-on state, the communication device 100 transits from the power-on state to the power-off state, as indicated by an arrow e.

[3] Start Condition of Conversation Program

A start condition of the conversation program is set by a user's operation. The setting by the user's operation (hereinafter referred to as user setting) includes setting of automatic signing-in and setting of incoming call permission at standby time.

The user can set the automatic signing-in to "YES" or "NO" in the user setting. If the automatic signing-in is set to "YES", the signing-in is automatically performed.

If the automatic signing-in is set to "YES", the user can set the incoming call permission at standby time to "YES" or "NO". When the incoming call permission at standby time is set to "YES", an incoming call becomes possible even when the communication device 100 is in the standby state.

FIG. 4 illustrates an example of the start condition of the conversation program. In FIG. 4, "○" indicates that the conversation program is running, and "×" indicates that the conversation program is not running.

If the automatic signing-in is set to "YES", and the incoming call permission at standby time is set to "NO", the control LSI 101 starts the conversation program at the time of transition from the standby state to the power-on state. Then, the control LSI 101 communicates with the server for conversation 2000 using a user ID in which the automatic signing-in is set to "YES".

If the automatic signing-in is set to "YES", and the incoming call permission at standby time is set to "YES", the control LSI 101 starts the conversation program at the time of transition from the power-off state to the standby state. Then, the control LSI 101 communicates with the server for conversation 200 using a user ID in which the automatic signing-in is set to "YES".

If the automatic signing-in is set to "NO", the control LSI 101 starts the conversation program when the user operates the conversation start button 412 in the power-on state.

[4] Outline of Operation in Terminal 1000 by User (1) Signing-in

In the following description, the video signal is fed from the communication device 100 to the monitor 301 in the television 300 via the D/A converter 303. The monitor 301 in the television 300 displays video based on the fed video signal. The audio signal is fed from the communication device 100 to the speaker 302 in the television 300 via the D/A converter 304. The speaker 302 in the television 300 outputs audio based on the fed audio signal.

An outline of the operation in the terminal 1000 by the user, together with the video to be displayed on the monitor 301 in the television 300, will be described.

When one user signs in to the server for conversation 2000 using the terminal 1000, the one user operates the conversation start button 412 illustrated in FIG. 1, for example. Thus, an operation signal indicating that the conversation program is to be executed is fed from the remote controller 400 to the communication device 100. The conversation program is executed so that a sign-in screen is displayed on the monitor 301 in the television 300.

Figure 5:
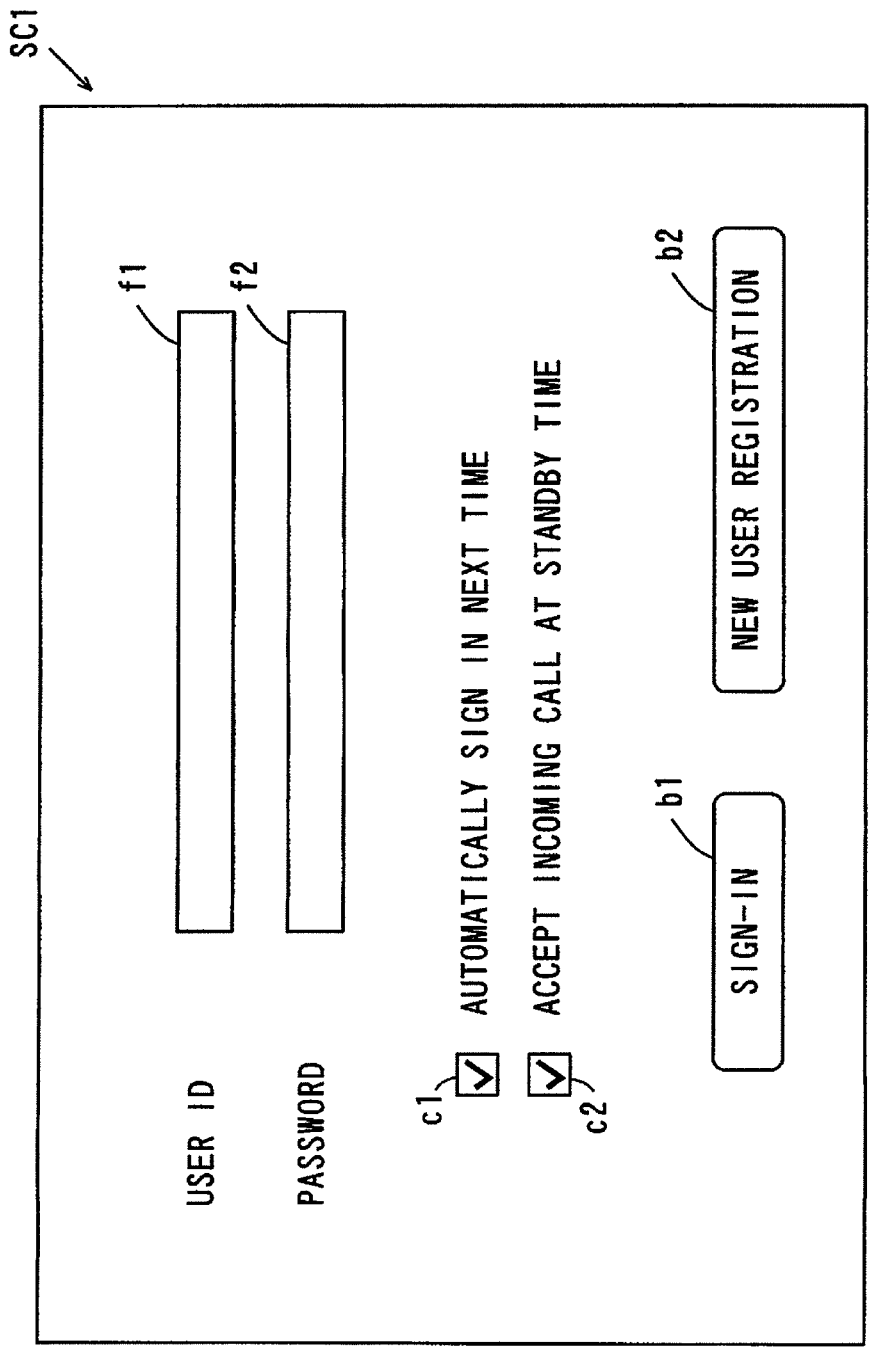
FIG. 5 illustrates a sign-in screen.

FIG. 5 illustrates the sign-in screen. As illustrated in FIG. 5, an input frame f1 for a user ID, an input frame f2 for a password, a sign-in button b1, and a new user registration button b2 are displayed on a sign-in screen SC1. The user can select the input frames f1 and f2, the sign-in button b1, and the new user registration button b2 by operating the cross key 414 in the remote controller 400 illustrated in FIG. 1. The user can input characters in the input frames f1 and f2 using the plurality of number buttons (not illustrated) in the remote controller 400 illustrated in FIG. 1.

After inputting a user ID and a password in the respective input frames f1 and f2, the user selects the sign-in button b1 and operates the determination button 415 in the remote controller 400 illustrated in FIG. 1. Thus, signing-in to the server for conversation 2000 is performed.

A check box c1 for selecting "automatically sign in next time" for setting automatic signing-in and a check box c2 for selecting "accept incoming call at standby time" are displayed on the sign-in screen SC1.

When the signing-in is performed with the check box c1 selected, the control LSI 101 associates information indicating that the automatic signing-in is "YES" with the user ID input to the input frame f1, and stores the information in the flash memory 112. Thus, the automatic signing-in is set to "YES".

When the signing-in is performed with the check box c2 selected, the control LSI 101 associates information indicating that the incoming call permission at standby time is "YES" with the user ID input to the input frame f1, and stores the information in the flash memory 112. Thus, the incoming call permission at standby time is set to "YES".

If the user does not select the check box c1, the sign-in screen SC1 is configured so that the check box c2 cannot be selected.

In the present embodiment, the automatic signing-in is settable to "YES" for only the one user ID. Thus, processing of the control LSI 101 is prevented from being complicated.

(2) User Registration

The user selects the new user registration button b2 in the sign-in screen SC1 and operates the determination button 415 in the remote controller 400 illustrated in FIG. 1 when registering user information in the server for conversation 2000. In this case, a user registration screen is displayed on the monitor 301 in the television 300.

Figure 6:
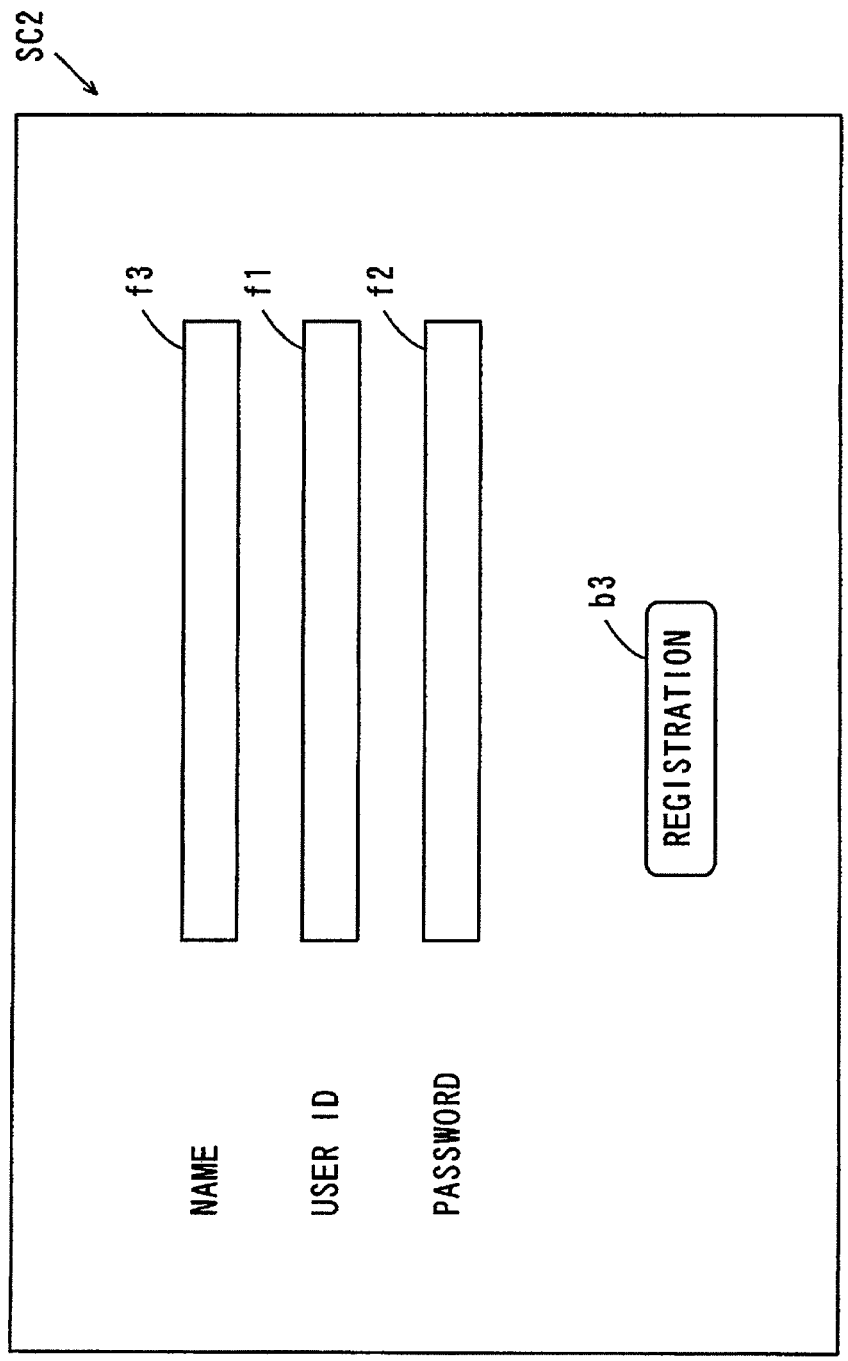
FIG. 6 illustrates a user registration screen.

FIG. 6 illustrates the user registration screen. As illustrated in FIG. 6, an input frame f3 for a user name, the input frame f1 for a user ID, an input frame f2 for a password, and a registration button b3 are displayed on the user registration screen SC2. The user can select the input frames f1, f2, and f3 and the registration button b3 by operating the cross key 414 in the remote controller 400 illustrated in FIG. 1. After inputting the user ID, the password, and the name in the respective input frames f1, f2, and f3, the user selects the registration button b3, and operates the determination button 415 in the remote controller 400 illustrated in FIG. 1. Thus, the user information is registered in the server for conversation 2000.

The signing-in to the server for conversation 2000 is performed so that a contact screen is displayed on the monitor 301 in the television 300.

(3) Contact List

Figure 7:
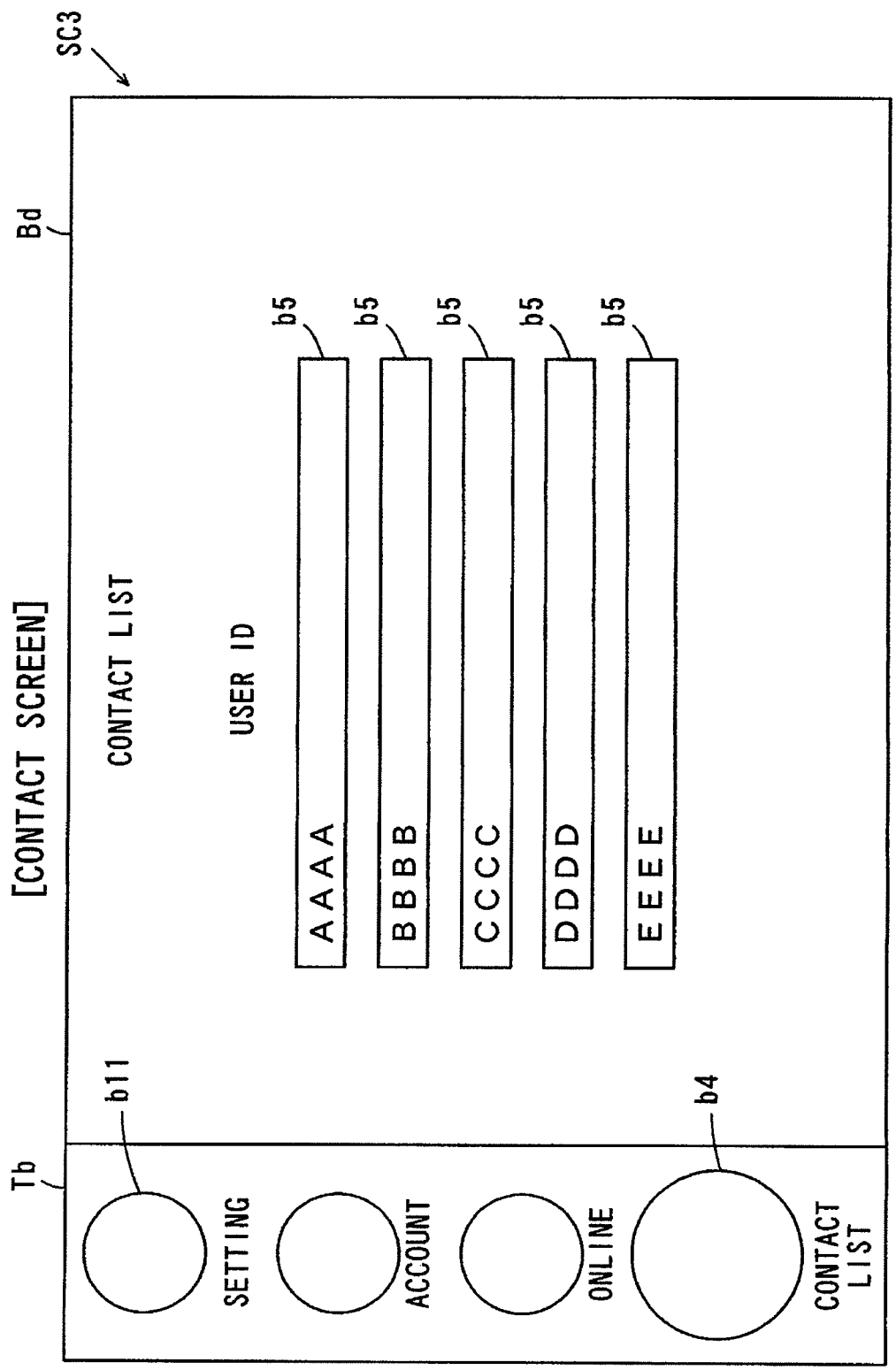
FIG. 7 illustrates an example of a contact screen.

FIG. 7 illustrates an example of the contact screen. A contact screen SC3 includes a tub Tb on the left side and a main body portion Bd on the right side. The tab Tb includes a plurality of large items. The plurality of large items include "set", "account", "online", and "contact list". The user can select processing to be performed in the conversation program from the large items in the tub Tb using the cross key 414 and the determination button 415 in the remote controller 400.

As described above, the contact list is stored in the flash memory 112 in the communication device 100 illustrated in FIG. 2. As illustrated in FIG. 7, a contact list button b4 for displaying the contact list stored in the flash memory 112 is displayed on the tab Tb in the contact screen SC3. In this state, the user selects the contact list button b4, and operates the determination button 415 in the remote controller 400 illustrated in FIG. 1. In this case, the contact list is displayed on the main body portion Bd in the contact screen SC3.

As illustrated in FIG. 7, a plurality of user ID buttons b5 associated with a plurality of user IDs, respectively, stored in the flash memory 112 in the communication device 100, for example, are displayed on the main body portion Bd in the contact screen SC3. The user selects any of the plurality of user ID buttons b5, and operates the determination button 415 in the remote controller 400 illustrated in FIG. 1.

Thus, the selected user ID, together with a request signal, is transmitted to the server for conversation 2000. When the signing-in using the selected user ID has already been performed, the communication device 100 in the terminal 1000 acquires an address of the other communication terminal used for the signing-in using the user ID from the server for conversation 2000.

Thereafter, a conversation request for requesting a conversation (a conversation request signal) is transmitted from the communication device 100 in the terminal 1000 to the other communication terminal using the acquired address. The communication device 100 receives a response signal from the other communication terminal so that a conversation screen, described below, is displayed on the monitor 301 in the television 300.

(4) User Setting

Figure 8:
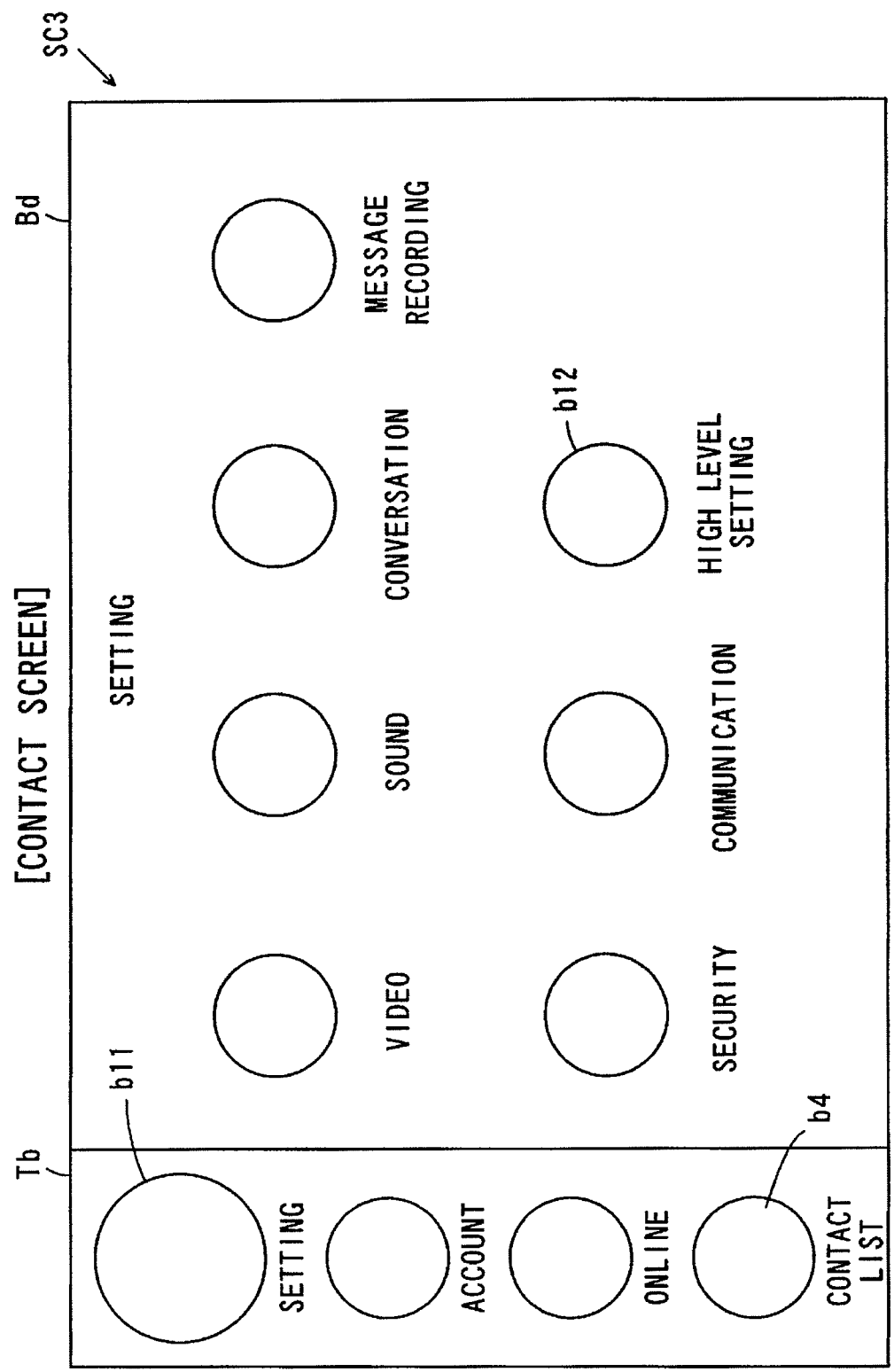
FIG. 8 illustrates another example of a contact screen.

FIG. 8 illustrates another example of a contact screen. When the user selects a setting button b11, middle items "video", "sound", "conversation", "message recording", "security", "communication", and "high level setting" included in the large item "setting" are displayed in a main body portion Bd.

When the user selects a high level setting button b12, a small item (not illustrated) is displayed in the main body portion Bd. The small item includes "automatic signing-in" and "incoming call permission at standby time". The user can set the automatic signing-in to "YES" or "NO" depending on "automatic signing-in" in the small item. The user can set the incoming call permission at standby time to "YES" or "NO" depending on "incoming call permission at standby time" in the small item.

(5) Incoming Call Screen

If the communication device 100 is in the power-on state, the conversation program is started, as illustrated in FIG. 4. In this case, when a conversation request is received from the communication terminal of the other user, an incoming call screen is displayed on the monitor 301 in the television 300.

If the communication device 100 is in the standby state and the incoming call permission at standby time is set to "YES", the conversation program is also started. In this case, even if the conversation request is received from the communication terminal of the other user, the incoming call screen is not displayed on the monitor 301 in the television 300.

Figure 9:
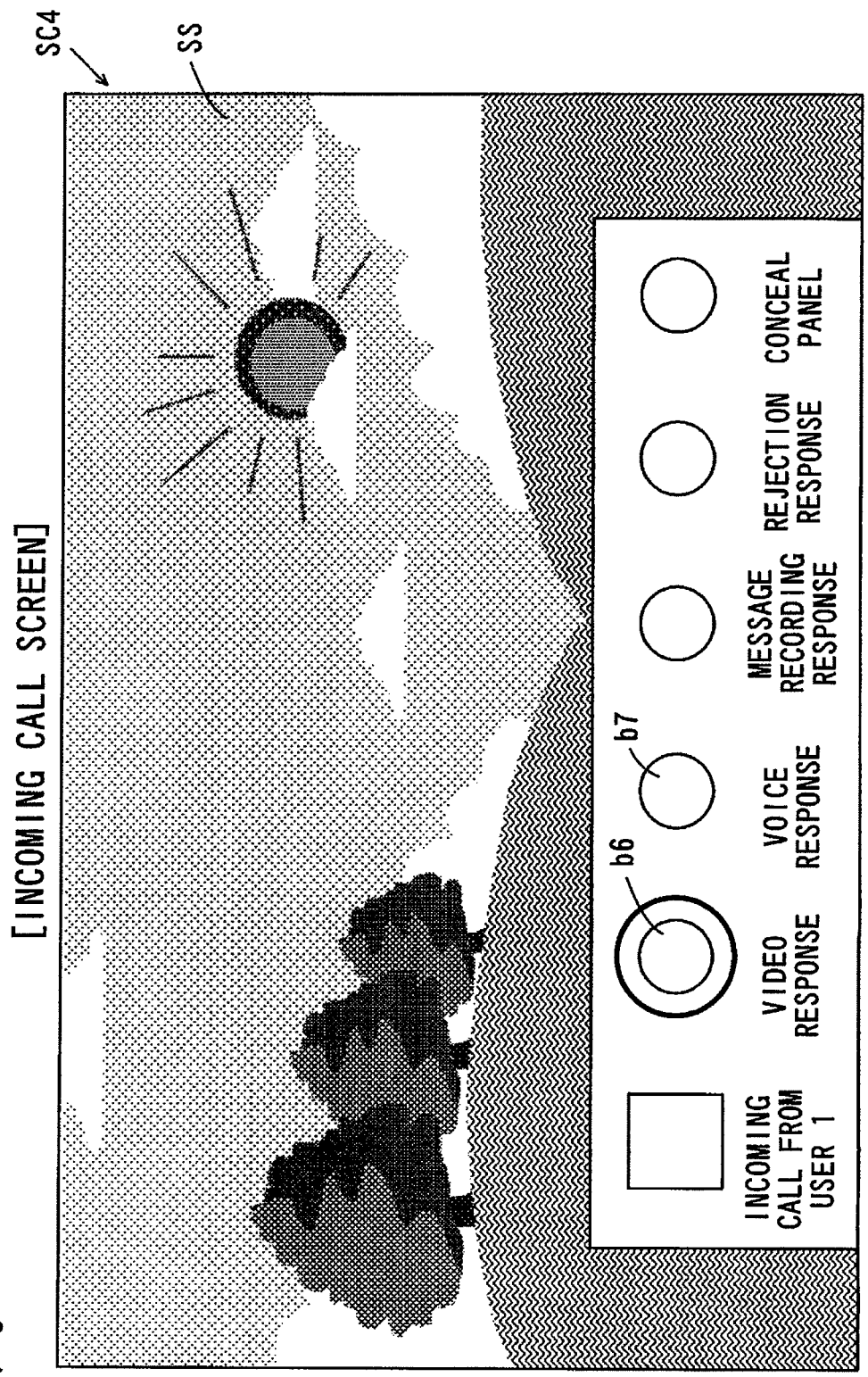
FIG. 9 illustrates an example of an incoming call screen.
Figure 10:
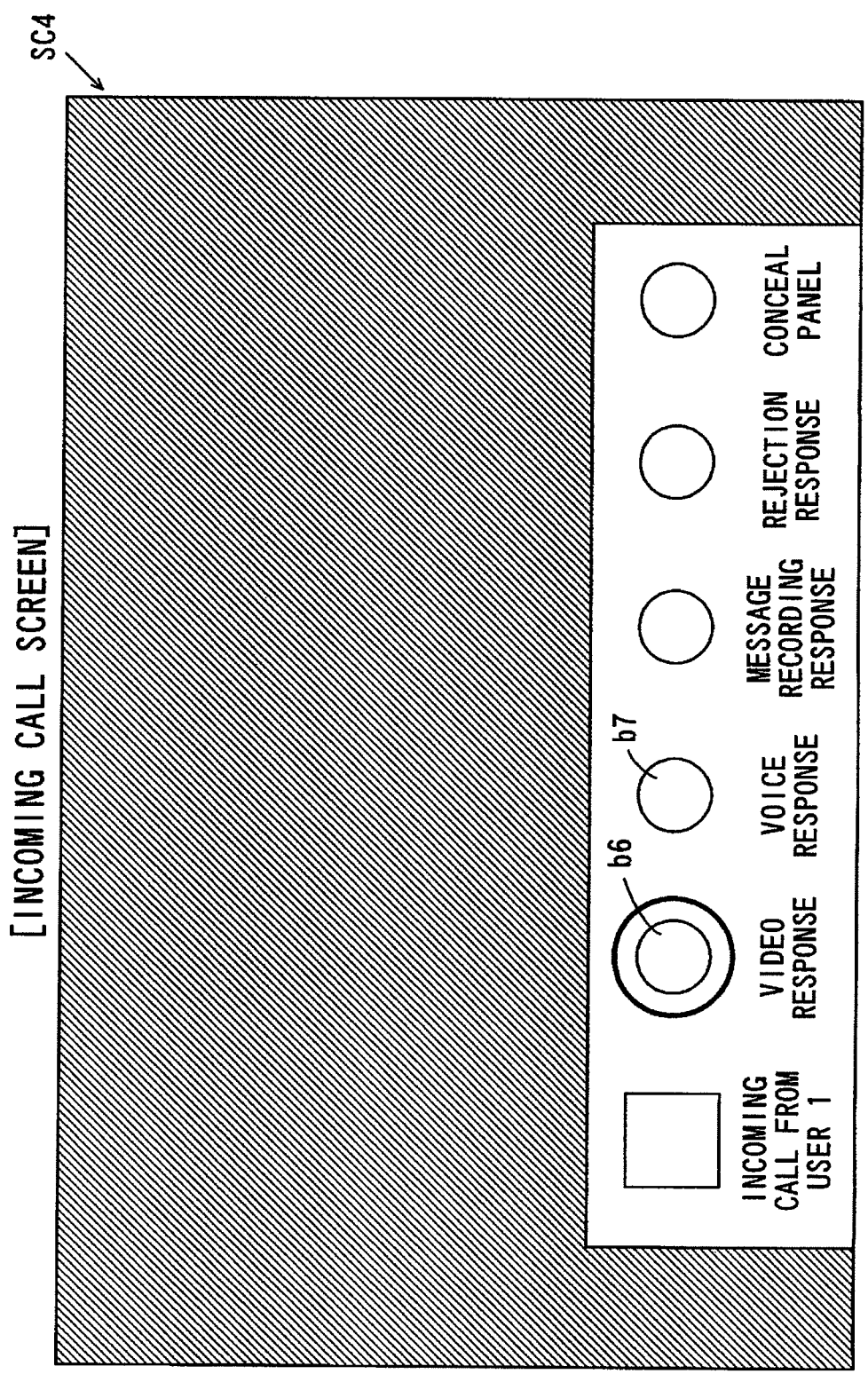
FIG. 10 illustrates another example of an incoming call screen.

FIG. 9 illustrates an example of the incoming call screen. FIG. 10 illustrates another example of the incoming call screen. As illustrated in FIGS. 9 and 10, a video response button b6 and a voice response button b7, for example, are displayed on an incoming call screen SC4. In the example illustrated in FIG. 9, landscape video SS is further displayed on the incoming call screen SC4. In the example illustrated in FIG. 10, landscape video is not displayed on the incoming call screen SC4.

When the conversation request is received from the communication terminal of the other user, the buzzer 193 illustrated in FIG. 2 generates a ringtone while the LED unit 192 lights up or flashes. Information (e.g., a name or a user ID) for specifying the other user is displayed on the FL display 191. Thus, the user of the terminal 1000 can recognize an incoming call regardless of whether the incoming call screen SC4 is displayed on the monitor 301.

The user can select the video response button b6 in the incoming call screen SC4 illustrated in FIG. 9 or 10. Selecting the video response button b6 means designating the video response button b6 by operating the cross key 414 in the remote controller 400 illustrated in FIG. 1, for example, and then pressing the determination button 415. When the user selects the video response button b6, the control LSI 101 performs a video/audio conversation operation.

In the video/audio conversation operation, the control LSI transmits video data and audio data to the other communication terminal, and receives data (video data and audio data, or audio data) transmitted from the other communication terminal. In this case, video data based on video of the user acquired by the camera 201 illustrated in FIG. 1 and audio data based on audio of the user input to the microphone 202 illustrated in FIG. 1 are transmitted from the communication device 100 to the other communication terminal. Thus, video of the user of the terminal 1000 is displayed on a monitor in the other communication terminal while audio of the user of the terminal 1000 is output from a speaker in the other communication terminal. Thus, the user can start to talk with the user of the other communication terminal while seeing the video.

The user can select the voice response button b7 in the incoming call screen SC4. Selecting the voice response button b7 means designating the voice response button b7 by pressing the cross key 414 in the remove controller 400 illustrated in FIG. 1, for example, and then operating the determination button 415. When the user selects the voice response button b7, the control LSI 101 performs an audio conversation operation.

In the audio conversation operation, the control LSI 101 does not transmit video data but transmits audio data to the other communication terminal, and receives data (video data and audio data, or audio data) transmitted from the other communication terminal. In this case, video data is not transmitted, but audio data based on the audio of the user input to the microphone 202 illustrated in FIG. 1 is transmitted from the communication device 100 to the other communication terminal. Thus, the video of the user of the terminal 1000 is not displayed on the monitor in the other communication terminal, and the audio of the user of the terminal 1000 is output from the speaker in the other communication terminal. Thus, the user can start to talk with the user of the other communication terminal without making the user of the other communication terminal see his/her own video.

The user can operate the conversation response button 413 in the remote controller 400 illustrated in FIG. 1. Operating the conversation response button 413 means pressing the conversation response button 413, for example. When the user operates the conversation response button 413, the control LSI 101 performs the audio conversation operation. Thus, the user can start to talk with the user of the other communication terminal without making the user of the other communication terminal see his/her own video.

As described above, if the communication device 100 is in the standby state, the incoming call screen is not displayed on the monitor 301. Therefore, the user of the terminal 1000 recognizes an incoming call by the ringtone by the buzzer 193 illustrated in FIG. 2, a state where the LED unit 192 lights up, and information displayed on the FL display 191. In this case, the user can operate the conversation response button 413 in the remote controller 400 illustrated in FIG. 1. When the user operates the conversation response button 413 in a similar manner to the above, the control LSI 101 performs the audio conversation operation. Thus, the user can start to talk with the user of the other communication terminal without making the user of the other communication terminal see his/her own video.

(6) Conversation Screen

Figure 11:
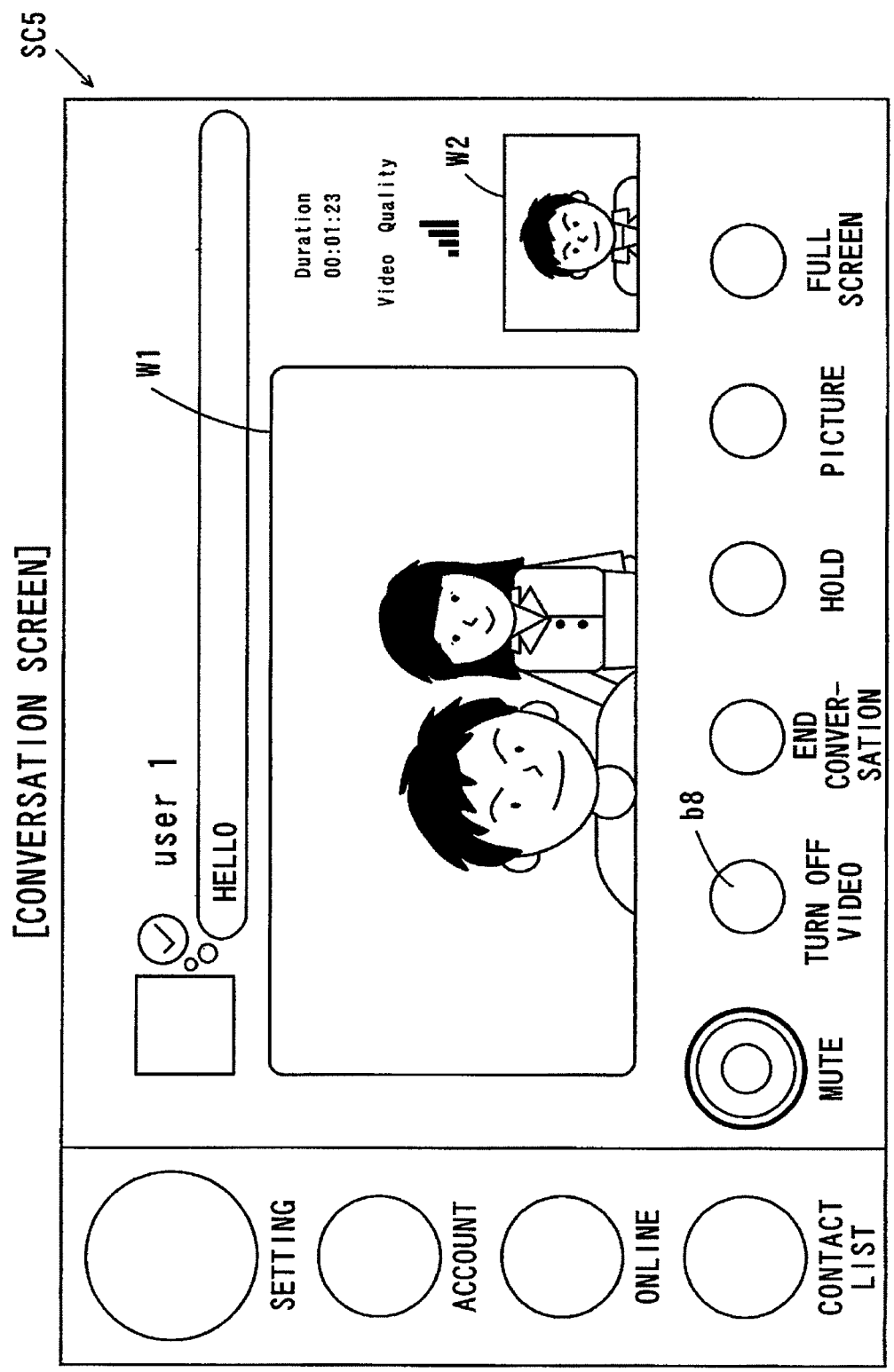
FIG. 11 illustrates an example of a conversation screen during a conversation using video and audio.

FIG. 11 illustrates an example of a conversation screen during a conversation using video and audio. If the video response button b6 illustrated in FIG. 9 or 10 is selected, and the video/audio conversation operation is performed, as described above, a conversation screen SC5 illustrated in FIG. 11 is displayed on the monitor 301 in the television 300. In an example illustrated in FIG. 11, a conversation partner display window W1 and a self-display window W2 are displayed on the conversation screen SC5. Video of the other user captured by a camera in the other communication terminal is displayed on the conversation partner display window W1. The video of the user captured by the camera 201 in the camera/microphone device 200 is displayed on the self-display window W2. The audio of the user of the terminal 1000 is input to the microphone 202 in the camera/microphone device 200. Audio of the other user input to a microphone in the other communication terminal is output from the speaker 302 in the television 300.

If the conversation screen SC5 illustrated in FIG. 11 is displayed on the monitor 301 in the television 300 in the terminal 1000, the conversation screen SC5, which is similar to that illustrated in FIG. 11, is also displayed on the monitor in the communication terminal of the other user. The video of the user of the terminal 1000 and the video of the user of the other communication terminal are displayed on the monitor in the communication terminal of the other user. The audio of the other user is input to the microphone in the other communication terminal. The audio of the user of the terminal 1000 is output from the speaker in the other communication terminal.

A video off button b8 is displayed on the conversation screen SC5 during the conversation using video and audio. The user of the terminal 1000 can select the video off button b8. Selecting the video off button b8 means designating the video off button b8 by operating the cross key 414 in the remote controller 400 illustrated in FIG. 1, for example, and then pressing the determination button 415. In this case, the video/audio conversation operation is switched to the audio conversation operation. Thus, the conversation using video and audio is switched to a conversation using only audio. A conversation screen SC6 illustrated in FIG. 12, described below, is displayed in place of the conversation screen SC5 illustrated in FIG. 11 on the monitor 301 in the television 300. At the same time, the video of the user of the terminal 1000 is not displayed, as illustrated in FIG. 13, described below, on the monitor in the communication terminal of the other user.

Figure 12:
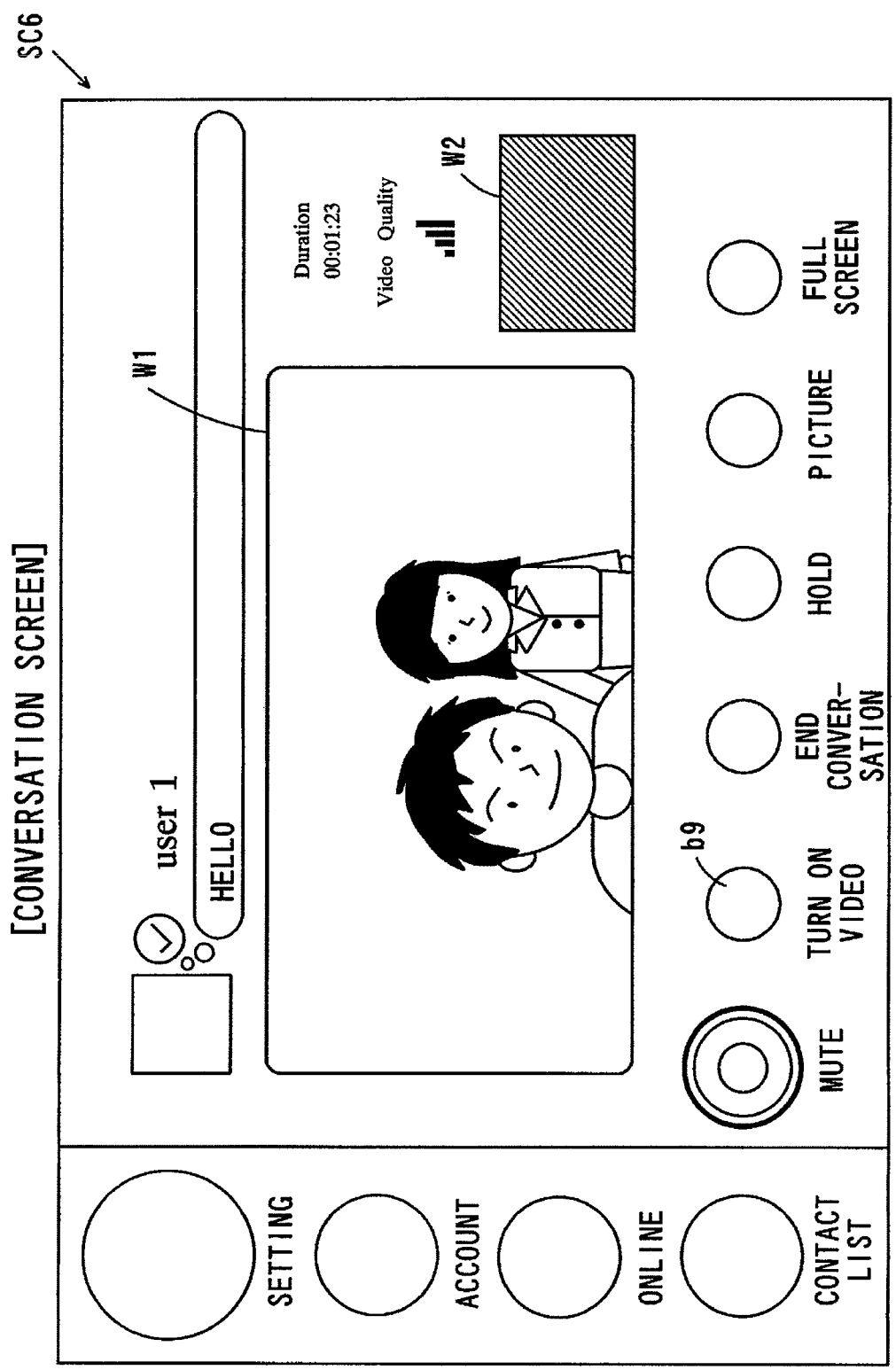
FIG. 12 illustrates an example of a conversation screen during a conversation using only audio.

FIG. 12 illustrates an example of a conversation screen during the conversation using only audio. If the voice response button b7 illustrated in FIG. 9 or 10 is selected, the conversation screen SC6 illustrated in FIG. 12 is displayed on the monitor 301 in the television 300. Alternatively, if the conversation response button 413 in the remote controller 400 illustrated in FIG. 1 is operated, the conversation screen SC6 illustrated in FIG. 12 is displayed on the monitor 301 in the television 300. The conversation partner display window W1 and the self-display window W2 are also displayed on the conversation screen SC6 illustrated in FIG. 12. While the video of the other user captured by the camera in the other communication terminal is displayed on the conversation partner display window W1, the video of the user of the terminal 1000 is not displayed on the self-display window W2. In the example illustrated in FIG. 12, the self-display window W2 is in a blackout state. At this time, the audio of the user of the terminal 1000 is input to the microphone 202 in the camera/microphone device 200. The audio of the other user input to the microphone in the other communication terminal is output from the speaker 302 in the television 300.

A video on button b9 is displayed on the conversation screen SC6 during the conversation using only audio. The user of the terminal 1000 can select the video on button b9. Selecting the video on button b9 means designating the video on button b9 by operating the cross key 414 in the remote controller 400 illustrated in FIG. 1, for example, and then pressing the determination button 415. In this case, the audio conversation operation is switched to the video/audio conversation operation. Thus, the conversation using only audio is switched to the conversation using only video and audio. The conversation screen SC5 illustrated in FIG. 11 is displayed in place of the conversation screen SC6 illustrated in FIG. 12 on the monitor 301 in the television 300. At the same time, the video of the user of the terminal 1000 is displayed on the monitor in the communication terminal of the other user.

Figure 13:
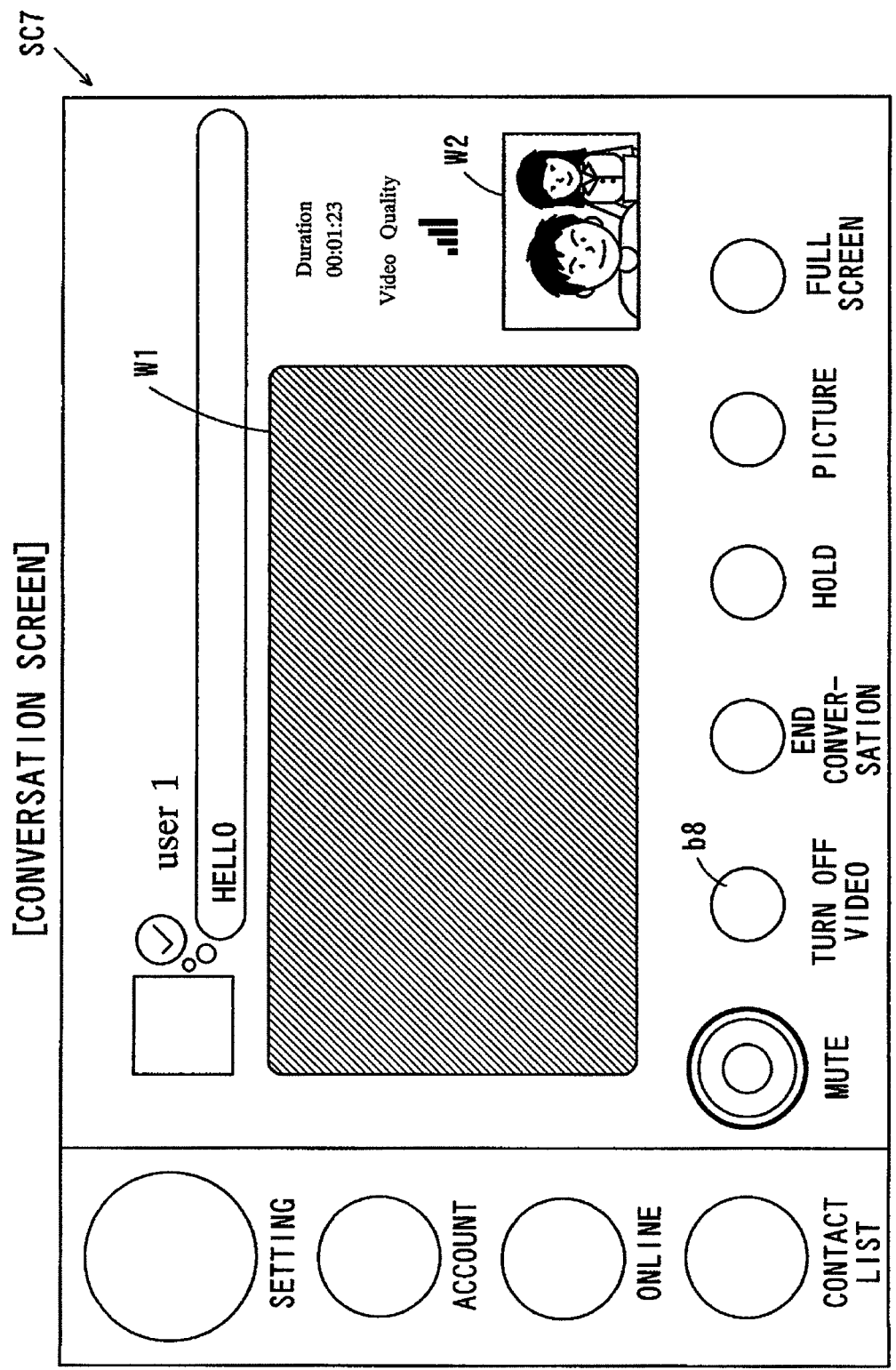
FIG. 13 illustrates an example of a conversation screen displayed on a monitor in a communication terminal of another user when the conversation screen illustrated in FIG. 12 is displayed on a monitor in the terminal illustrated in FIG. 1.

FIG. 13 illustrates an example of a conversation screen displayed on the monitor in the communication terminal of the other user when the conversation screen SC6 illustrated in FIG. 12 is displayed on the monitor 301 in the terminal 1000 illustrated in FIG. 1. If the conversation screen SC6 illustrated in FIG. 12 is displayed on the monitor 301 in the television 300, on a conversation screen SC7 displayed on the monitor in the communication terminal of the other user, the video of the other user is displayed on the self-display window W2, as illustrated in FIG. 13, while the video of the user of the terminal 1000 is not displayed on the conversation partner display window W1. At this time, the audio of the other user is input to the microphone in the other communication terminal. The audio of the user of the terminal 1000 is output from the speaker in the other communication terminal.

[5] Conversation Operation Based on Conversation Program

Figure 14:
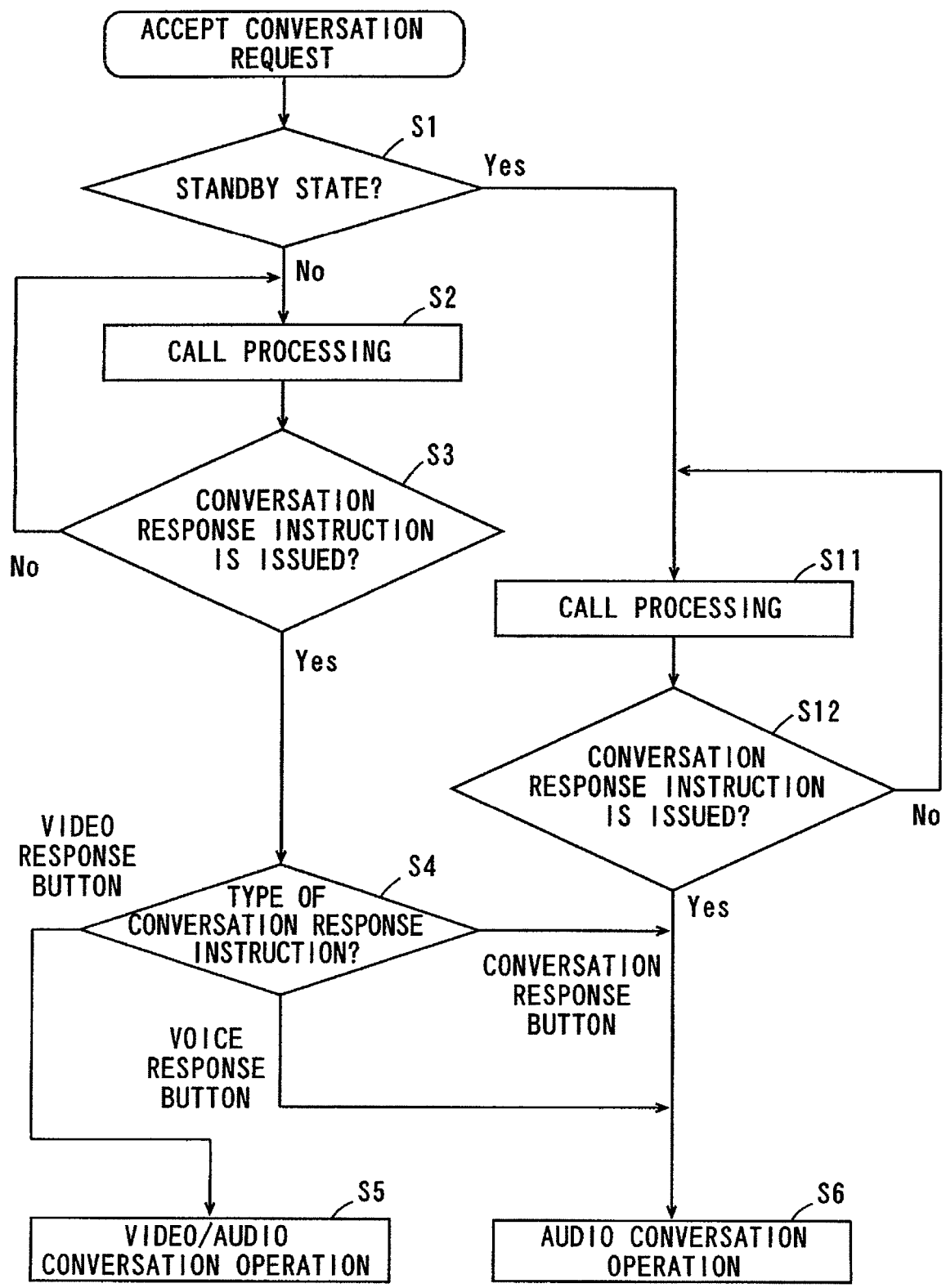
FIG. 14 is a flowchart illustrating an example of a conversation operation of a control LSI based on a conversation program according to the embodiment of the present invention.

An example of a conversation operation based on a conversation program according to an embodiment of the present invention will be described. FIG. 14 is a flowchart illustrating an example of a conversation operation of the control LSI 101 based on the conversation program according to the embodiment of the present invention. In an operation, described below, the communication device 100 is in the power-on state or the standby state. The user of the terminal 1000 signs in to the server for conversation 2000, or the automatic signing-in is set. Further, the incoming call permission at standby time is set to "YES". Therefore, the conversation program is running.

The control LSI 101 illustrated in FIG. 2 accepts a conversation request from the other communication terminal. In this case, in step 51, the control LSI 101 determines whether the communication device 100 is in the standby state. If the communication device 100 is in not the standby state but the power-on state (NO in step S1), the processing proceeds to step S2. In step S2, the control LSI 101 performs call processing. In the call processing, the control LSI 101 causes the buzzer 193 illustrated in FIG. 2 to generate a ringtone while causing the LED unit 192 to light up or flash, to display information (e.g., a name or a user ID) for specifying the other user on the FL display 191. Thus, the user is notified that an incoming call is received from the other communication terminal. The control LSI 101 displays the incoming call screen SC4 illustrated in FIG. 9 or 10 on the monitor 301 in the television 300.

In step S3, the control LSI 101 then determines whether the user issues a conversation response instruction. The user can issue the conversation response instruction by selecting the video response button b6 or the voice response button b7 in the incoming call screen SC4. Alternatively, the user can easily issue the conversation response instruction by operating the conversation response button 413 in the remote controller 400. If the user does not issue the conversation response instruction (NO in step S3), the processing returns to step S2.

If the user issues the conversation response instruction (YES in step S3), the processing proceeds to step S4. In step S4, the control LSI 101 determines the type of the conversation response instruction by the user. More specifically, the control LSI 101 determines whether the video response button b6 is selected, the voice response button b7 is selected, or the conversation response button 413 is operated.

If the video response button b6 is selected, the processing proceeds to step S5. In step S5, the control LSI 101 performs the video/audio conversation operation. On the other hand, if the voice response button b7 is selected, the processing proceeds to step S6. In step S6, the control LSI 101 performs the audio conversation operation. If the conversation response button 413 is operated, the control LSI 101 also performs the process in step S6.

If the communication device 100 is in the standby state (YES in step S1), the processing proceeds to step S11. In step S11, the control LSI 101 also performs call processing. During the call processing in step S11, the incoming call screen SC4 illustrated in FIG. 9 or 10 is not displayed on the monitor 301 in the television 300, unlike that during the call processing in step S2.

In step S12, the control LSI 101 then determines whether the user issues the conversation response instruction. At this time, the incoming call screen SC4 illustrated in FIG. 9 or 10 is not displayed on the monitor 301 in the television 300, as described above. Therefore, in step S12, the control LSI 101 determines whether the conversation response button 413 is operated.

If the user issues the conversation response instruction (YES in step S12), the control LSI 101 turns on the power supply switch in the television 300, and causes the state of the communication device 100 to transit from the standby state to the power-on state, and then the processing proceeds to step S6. On the other hand, if the user does not issue the conversation response instruction (NO in step S12), the processing returns to step S11.

[6] Conversation Operation

The conversation operation in the terminal 1000 based on the conversation program stored in the memory 101M of the control LSI 101 illustrated in FIG. 2, together with a detailed configuration of the control LSI 101, will be described. The control LSI 101 in the communication device 100 performs the video/audio conversation operation.

Figure 15:
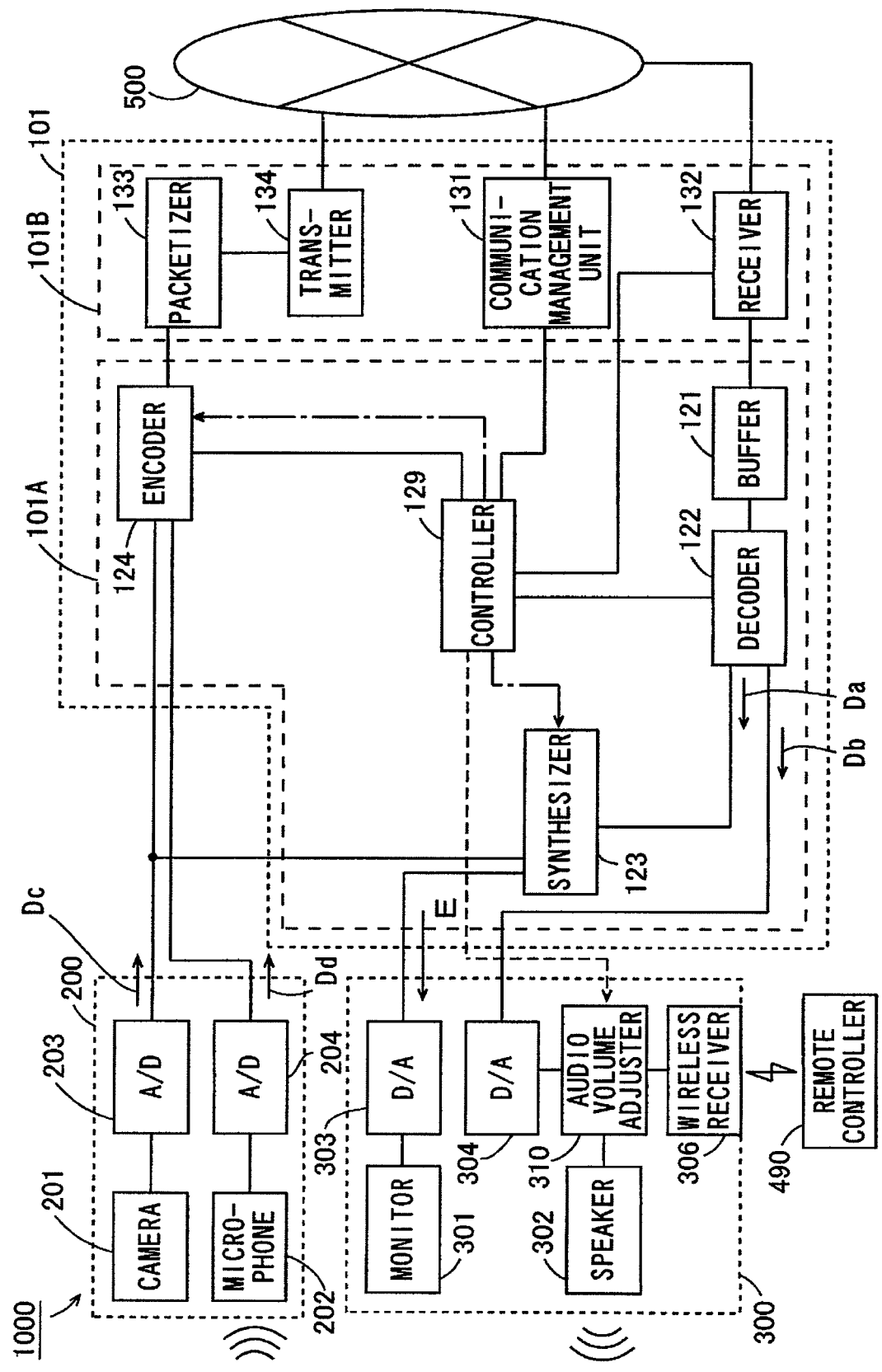
FIG. 15 is a block diagram illustrating a detailed configuration and an operation of the control LSI illustrated in FIG. 2.

FIG. 15 is a block diagram illustrating a detailed configuration and an operation of the control LSI 101 illustrated in FIG. 2. A connection relationship among the control LSI 101, and the camera/microphone device 200, the television 300, and the network 500 illustrated in FIG. 2 is illustrated in FIG. 15. Illustration of an interface of each connection unit is omitted.

As illustrated in FIG. 15, the control LSI 101 includes a control block 101A and a communication block 101B. The control block 101A includes a buffer 121, a decoder 122, a synthesizer 123, an encoder 124, and a controller 129. The communication block 101B includes a communication management unit 131, a receiver 132, a packetizer 133, and a transmitter 134.

In the communication block 101B in the control LSI 101, when communication is performed between the terminal 1000 and the other communication terminal, the communication management unit 131 detects an encoding method of data that can be decoded in the other communication terminal, and feeds an instruction signal for issuing an instruction to encode data for transmission in the detected encoding method to the controller 129 in the control block 101A. If video data encoded in an H.264 format can be decoded in the other communication terminal, for example, the communication management unit 131 feeds an instruction signal for issuing an instruction to encode the video data in an H.264 format to the controller 129. If audio data encoded in a SILK format can be decoded in the other communication terminal, the communication management unit 131 feeds an instruction signal for issuing an instruction to encode the audio data in the SILK format to the controller 129.

The other communication terminal transmits data (video data and audio data) to the terminal 1000 via the network 500. The receiver 132 in the terminal 1000 receives the data (video data and audio data, or audio data) transmitted from the other communication terminal. The received data is packetized.

The receiver 132 feeds the received data to the buffer 121 in the control block 101A. The data is temporarily stored in the buffer 121. The receiver 132 feeds a reception signal indicating that the data (video data and audio data, or audio data) is being received to the controller 129.

In this case, the controller 129 feeds an instruction signal for issuing an instruction to decode the data (video data and audio data, or audio data) stored in the buffer 121 to the decoder 122. Thus, the decoder 122 decodes the data (video data and audio data, or audio data) stored in the buffer 121.

In the following description, the video data decoded by the decoder 122 is referred to as received video data Da, and the audio data decoded by the decoder 122 is referred to as received audio data Db.

The received video data Da is fed to the synthesizer 123. Transmitted video data Dc, described below, is fed from the camera/microphone device 200 to the synthesizer 123. The synthesizer 123 synthesizes the received video data Da and the transmitted video data Dc into synthesized video data E.

The synthesizer 123 feeds the generated synthesized video data E to a D/A converter 303 in the television 300. The D/A converter 303 converts the synthesized video data E in a digital format to a synthesized video signal in an analog format. Thus, video based on the synthesized video signal (e.g., the conversation screens SC5 and SC6 illustrated in FIGS. 11 and 12) to be displayed on the monitor 301 in the television 300.

The received audio data Db is fed to the D/A converter 304 in the television 300. The D/A converter 304 converts the received audio data Db in a digital format to an audio signal in an analog format. The audio signal in an analog format is input to the speaker 302 via the audio volume adjuster 310. Audio based on the audio signal is output from the speaker 302.

The camera 201 in the camera/microphone device 200 acquires video. A video signal based on the acquired video is fed to an A/D converter 203. The A/D converter 203 converts the video signal in an analog format to video data in a digital format.

Audio is input to the microphone 202 in the camera/microphone device 200. An audio signal based on the input audio is fed to the A/D converter 204. The A/D converter 204 converts the audio signal in an analog format to audio data in a digital format.

In the following description, the video data after the conversion by the A/D converter 203 is referred to as transmitted video data Dc, and the audio data after the conversion by the A/D converter 204 is referred to as transmitted audio data Dd.

When the received audio data Db is fed from the communication device 100 to the television 300, the audio based on the received audio data Db is output from the speaker 302. In the camera/microphone device 200, the transmitted audio data Dd based on the input audio is generated, and is fed to the communication device 100.

During the conversation operation, when an instruction signal relating to encoding is fed from the communication management unit 131 to the controller 129, the controller 129 feeds a designation signal for designating an encoding method according to the fed instruction signal to the encoder 124. Thus, the encoder 124 encodes the transmitted video data Dc and the transmitted audio data Dd in the encoding method designated by the designation signal. The encoded transmitted video data Dc and transmitted audio data Dd are fed to the packetizer 133. The packetizer 133 packetizes the transmitted video data Dc and the transmitted audio data Dd. The packetized transmitted video data Dc and transmitted audio data Dd are transmitted from the transmitter 134 to the communication terminal of the other user via the network 500.

The functions of the controller 129 are implemented by hardware such as a central processing unit (CPU) and a memory 101M (FIG. 2) and software such as computer programs.

The buffer 121, the decoder 122, the synthesizer 123, the encoder 124, the communication management unit 131, the receiver 132, the packetizer 133, and the transmitter 134 may be implemented by hardware such as electronic circuits, and parts of these constituent elements may be implemented by hardware such as a CPU and a memory and software such as computer programs.

While the case where the video/audio conversation operation is performed has been described above, the controller 129 feeds an instruction signal for instructing the synthesizer 123 not to perform synthesis processing while feeding an instruction signal for instructing the encoder 124 not to feed the transmitted video data Dc to the packetizer 133, as indicated by a one-dot and dash line in FIG. 15. In this case, the synthesizer 123 feeds only the received video data Da to the D/A converter 303 in the television 300. Thus, the video acquired by the camera 201 is not displayed on the monitor 301 in the television 300. The encoder 124 feeds only the transmitted voice data Dd to the packetizer 133. Thus, the transmitted video data Dc is not transmitted to the other communication terminal from the packetizer 133.

[7] Priority Processing (1) As described above, the communication device 100 includes one decoder 122 (FIG. 15) and one encoder 124 (FIG. 15). In the terminal 1000 illustrated in FIG. 1, when the optical disk drive 108 serving as a main functional unit operates, video data and audio data fed via a tuner (not illustrated) in the communication device 100 are recorded on an optical disk by the optical disk drive 108 (a broadcast program is recorded). Alternatively, video data and audio data stored in the optical disk are reproduced.

When the video data and the audio data are recorded, for example, the decoder 122 and the encoder 124 illustrated in FIG. 15 decode and encode data, respectively. More specifically, when the broadcast program is recorded, the decoder 122 decodes data (video data and audio data) representing the broadcast program. The encoder 124 encodes the decoded data at a predetermined compression rate. The encoded data is recorded on the optical disk. In the following description, an operation performed by the main functional unit is generically referred to as a main functional operation.

On the other hand, during a conversation operation in the terminal 1000, the decoder 122 illustrated in FIG. 15 decodes video data and audio data transmitted from the other communication terminal, and the encoder 124 illustrated in FIG. 15 encodes the transmitted video data Dc and the transmitted audio data Dd fed from the camera/microphone device 200.

If the communication device 100 includes only one decoder 122 (FIG. 15) and one encoder 124 (FIG. 15), the main functional operation and the conversation operation may be unable to be simultaneously performed by respective processing capabilities of the decoder 122 and the encoder 124. In this case, the broadcast program cannot be recorded during the conversation operation in the terminal 1000. On the other hand, the conversation operation in the terminal 1000 cannot be performed when the broadcast program is recorded in the terminal 1000.

The control LSI 101 performs priority processing, described below, based on the conversation program. In the following description, at least a part of the main functional operation is previously determined as a specific operation. In this example, the specific operation includes an operation for recording video data and audio data relating to the broadcast program on the optical disk using the optical disk drive 108 and an operation for reproducing video data and audio data recorded on an optical disk of a predetermined type using the optical disk drive 108.

Figure 16:
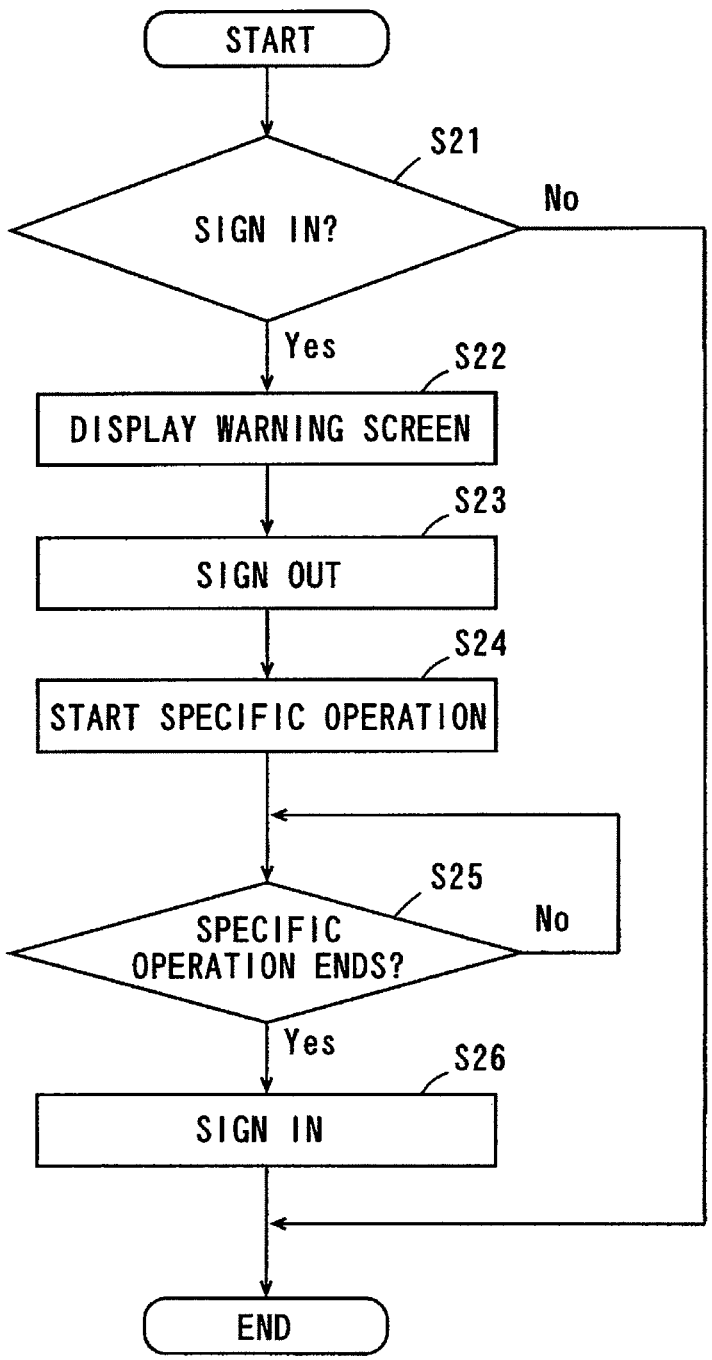
FIG. 16 is a flowchart illustrating an example of priority processing of the control LSI based on the conversation program according to the embodiment of the present invention.

FIG. 16 is a flowchart illustrating an example of the priority processing performed by the control LSI 101 based on the conversation program according to the one embodiment of the present invention. In this example, the control LSI 101 receives an instruction to start the specific operation based on the operation of the remote controller 400 illustrated in FIG. 1 by the user while performing the following processes.

In step S21, the control LSI 101 determines whether the user of the terminal 1000 signs in to the server for conversation 2000 when it receives the instruction to start the specific operation. If the user signs in to the server for conversation 2000 (YES in step S21), the processing proceeds to step S22. In step S22, the control LSI 101 displays a warning screen indicating that the user is to stop signing in to (sign out from) to the server for conversation 2000 on the monitor 301 in the television 300. In step S23, the control LSI 101 causes the user to stop signing in to (sign out from) the server for conversation 2000. When the process in step S22 is performed during the conversation operation in the terminal 1000, the conversation operation ends. If the user is not talking with the user of the other communication terminal using the terminal 1000 when the process in step S21 is performed, the process in step S22 need not be performed.

In a state where the user signs out from the server for conversation 2000, even if a conversation request is transmitted to the terminal 1000 from the other communication terminal, the communication device 100 illustrated in FIG. 15 does not receive the conversation request. Therefore, the incoming call screen SC4 illustrated in FIGS. 9 and 10 is not displayed on the monitor 301 in the television 300.

In step S24, the control LSI 101 then starts the specific operation. In step S25, the control LSI 101 determines whether the specific operation ends in a constant period. If the specific operation ends (YES in step S25), the processing proceeds to step S26. In step S26, the control LSI 101 causes the user to sign in to the server for conversation 2000 again. This enables the conversation request from the other communication terminal to be accepted in the terminal 1000.

Thus, according to the priority processing, the control LSI 101 causes the user to sign out before starting the specific operation, and performs the specific operation without accepting the conversation request from the other communication terminal. This prevents the specific operation from not being normally performed by performing a conversation operation during the specific operation.

(2) In the above-mentioned example, the control LSI 101 receives the instruction to start the specific operation so that a series of processes in steps S21 to S26 is performed. The present invention is not limited to this. The control LSI 101 may perform, when set to start the specific operation at a predetermined time point, the process in step S21 a predetermined time before the time point where the specific operation is started.

If the specific operation is an operation for recording a broadcast program and programmed recording of a scheduled broadcast program is performed, for example, the control LSI 101 performs the process in step S21 a predetermined time (one minute) before the time when the scheduled broadcast program starts to be broadcast. If the user of the terminal 1000 signs in to the server for conversation 2000, the control LSI 101 may display a warning screen indicating that the user signs out after a lapse of a predetermined time (one minute) on the monitor 301 in the television 300 as the process in step S22. Then, the control LSI 101 may cause the user to sign out from the server for conversation 200 to perform the process in step S23 simultaneously with the time when the scheduled broadcast program starts to be broadcast.

When the user visually recognizes the warning screen while talking with the other user, therefore, the user can finish talking before he/she signs out. Thus, the user is prevented from suddenly signing out while talking with the other user. As a result, the user is prevented from erroneously recognizing that the terminal 1000 has failed.

The control LSI 101 may transmit, when displaying the above-mentioned warning screen on the monitor 301 in the television 300 in the process in step S22, data for displaying the warning screen to the other communication terminal. In this case, the warning screen is also displayed on the monitor in the other communication terminal. Therefore, the user of the other communication terminal can recognize that a conversation operation is stopped after a lapse of a predetermined time.

(3) In the above-mentioned example, the conversation operation is stopped by the signing-out when the specific operation is started. Thus, the specific operation is performed prior to the conversation operation. The present invention is not limited to this. For example, the conversation operation may be performed prior to the specific operation. In this case, the specific operation is stopped when the conversation operation is started, for example.

(4) A case where the communication device 100 has a message recording function will be described. If the communication device has a message recording function, a response message (video data and audio data) for notifying that a user is absent, for example, is stored in the flash memory 112 illustrated in FIG. 2. In this example, a response message, which has been encoded in a plurality of types of compression encoding systems, is stored in the flash memory 112.

The control LSI 101 may control, if there is a conversation request from the other communication terminal, each of constituent elements in the communication device 100 to automatically respond to the conversation request by the message recording function instead of the user signing out from the server for conversation 200 when the specific operation is started.

If the conversation request is issued from the other communication terminal when the broadcast program is recorded, the response message encoded by any of the plurality of types of compression encoding systems can be read out of the flash memory 112 and transmitted to the other communication terminal. Therefore, the response message need not be encoded when transmitted. In this case, the control LSI 101 may record video data and audio data transmitted from the other communication terminal in the flash memory 112 without decoding the video data and the audio data. In this case, the control LSI 101 can respond to the conversation request from the other communication terminal without using the decoder 122 and the encoder 124 illustrated in FIG. 15.

[8] Effects (1) In the above-mentioned communication device 100, when the communication device 100 receives the conversation request from the other communication terminal when in the power-on state, the video response button b6 (FIG. 9) and the voice response button b7 (FIG. 9) are displayed on the incoming call screen SC4 illustrated in FIG. 9 or 10.

The user selects the video response button b6 on the screen using the remote controller 400 illustrated in FIG. 1 so that the user can start to talk with the user of the other communication terminal using both video and audio while watching the monitor 301. The user selects the voice response button b7 on the screen so that the user can start to talk with the user of the other communication terminal using only audio while watching the monitor 301.

In addition, the user operates the conversation response button 413 in the remote controller 400 illustrated in FIG. 1 so that the user can start to talk with the user of the other communication terminal using only audio simply and immediately. In this case, the conversation using both video and audio can be prevented from being started by erroneous selection.

Thus, the user can start the conversation using both video and audio or the conversation using only audio in a desired method depending on the situation. As a result, convenience for the user is improved.

(2) In the communication device 100 according to the present embodiment, the automatic signing-in is set to "YES", and the incoming call permission at standby time is set to "YES" so that an incoming call becomes possible even when the communication device 100 is in the standby state.

Even when the communication device 100 is in the standby state, the user may be in the vicinity of the communication device 100. The user can start to talk with the user of the other communication terminal using only audio simply and immediately by operating the conversation response button 413 in the remote controller 400 illustrated in FIG. 1. In this case, the conversation using both video and audio can be prevented from being started by erroneously selecting the video response button b6 and the voice response button b7 displayed on the monitor 301 illustrated in FIG. 2 when the communication device 100 is in the power-on state.

(3) As described above, the video on button b9 (FIG. 12) is displayed on the monitor 301 during the audio conversation operation started in step S6 illustrated in FIG. 14. In this case, the user can start the conversation using both video and audio by selecting the video on button b9 after confirming the user of the other communication terminal by the conversation using only audio. As a result, the user can avoid an undesirable partner visually recognizing his/her own video.

[9] Correspondences Between Elements in the Claims and Parts in Embodiments

In the following paragraphs, non-limiting examples of correspondences between various elements recited in the claims below and those described above with respect to various preferred embodiments of the present invention are explained.

In the embodiment, described above, the communication device 100 is an example of a communication device, the personal computer 600, the television 700, and the mobile phone 900 are examples of other devices, the conversation response button 413 is an example of an operating member, the transmitter 134 and the receiver 132 in the control LSI 101 are examples of a communicator, and the controller 129 in the control LSI 101 is an example of a controller.

The video response button b6 illustrated in FIGS. 9 and 10 is an example of a first index, the voice response button b7 illustrated in FIGS. 9 and 10 is an example of a second index, the video/audio conversation operation is an example of a first conversation operation, the audio conversation operation is an example of a second conversation operation, the remote controller 400 is an example of a remote controller, and the video off button b8 illustrated in FIGS. 11 and 12 is an example of a third index.

Further, the monitor 301 is an example of a video output device, the camera 201 is an example of a video input device, the microphone 202 is an example of an audio input device, the optical disk drive 108 is an example of a main functional unit, the power supplier 106 is an example of a power supplier, the remote controller 400 is an example of a switcher, and the conversation program is an example of a communication program.

As each of various elements recited in the claims, various other elements having configurations or functions described in the claims can be also used.

[10] Another Embodiment (1) In the above-mentioned embodiment, the operation unit 401 in the remote controller 400 is provided with the conversation start button 412 and the conversation response button 413. The conversation start button 412 is operated by the user when it starts the conversation program. The conversation response button 413 is operated by the user when it responds to the conversation request from the other communication terminal.

The remote controller 400 may be provided with a common operation button for enabling an operation for starting a conversation program and an operation for responding to a conversation request from another communication terminal instead of being provided with the conversation start button 412 and the conversation response button 413. In this case, the user can start the conversation program by operating the operation button when he/she does not sign in so that the conversation program is not started. The user can respond to the conversation request from the other communication terminal by operating the operation button when he/she signs in and receives the conversation request.

The conversation response button 413 serving as an operating member may be provided in not the remote controller 400 but a main body unit (casing) in the communication device 100, or may be provided in both the remote controller 400 and the main body unit (casing) in the communication device 100.

(2) While the communication device 100 includes the optical disk drive 108 as the main functional unit in the above-mentioned embodiment, the communication device 100 may include as a main functional unit another drive for driving another recording medium such as a hard disk or a memory card in place or in addition to the optical disk drive 108.

(3) While the optical disk drive 108 serving as the main functional unit of the communication device 100 is configured to record the video data and the audio data on the recording medium while reproducing the video data and the audio data from the recording medium, and the communication device 100 is the recording/reproduction device (recorder), the present invention is not limited to this. The optical disk drive 108 in the communication device 100 may be configured to reproduce video data and audio data from the recording medium, and the communication device 100 may be a reproduction device (player).

(4) The communication device may be a television receiver. In the case, the television receiver includes respective configurations of the communication device 100 and the television 300 illustrated in FIG. 2. The television receiver may or may not have the optical disk drive 108. In this case, the tuner 320 is an example of a main functional unit.

[11] Comprehensive Description of Communication Device and Communication Method According to Embodiment (1) According to the embodiment of the present invention, a communication device configured to be capable of communicating with another device and be operable using an operating member by a user while being connectable to a video output device includes a communicator configured to be capable of transmitting video data and audio data to the other device and be capable of receiving video data, audio data, and a conversation request transmitted from the other device, and a controller configured to selectively perform a first conversation operation for transmitting audio data and video data to the other device by the communicator and a second conversation operation for transmitting audio data to the other device by the communicator and not transmitting video data to the other device while being configured to selectably display a first index corresponding to the first conversation operation and a second index corresponding to the second conversation operation on a screen of the video output device, in which the controller is configured to determine whether the first index or the second index is selected on the screen and whether the operating member is operated when the communicator receives a conversation request from the other device, and perform the first conversation operation when the first index is selected, perform the second conversation operation when the second index is selected, and perform the second conversation operation when the operating member is operated.

In the communication device, the first index corresponding to the first conversation operation and the second index corresponding to the second conversation operation are selectably displayed on the screen of the video output device. When the communicator receives the conversation request from the other device, the controller determines whether the first index or the second index is selected on the screen and whether the operating member is operated. If the first index is selected, the controller performs the first conversation operation. If the second index is selected, the controller performs the second conversation operation. If the operating member is operated, the controller performs the second conversation operation.

The user can start a conversation using both video and audio or a conversation using only audio while viewing the screen by selecting the first index or the second index displayed on the screen of the video output device on the screen. The user can start the conversation using only audio simply and immediately by operating the operating member. In this case, the conversation using both video and audio can be prevented from being started by erroneous selection.

Thus, the user can start the conversation using both video and audio or the conversation using only audio in a desired method depending on the situation. As a result, convenience for the user is improved.

(2) The operating member may be provided in a remote controller for controlling the communication device. In this case, the user can cause the controller to perform the second conversation operation simply and immediately without erroneously selecting the first conversation operation by a remote operation using the remote controller.

(3) The controller may be configured to selectably display a third index corresponding to the first conversation operation on the screen of the video output device while performing the second conversation operation, and switch the second conversation operation to the first conversation operation when the third index is selected.

In this case, the user can select the third index at desired timing while the second conversation operation is performed. Thus, the user can start the conversation using both video and audio after confirming a user of the other device by the conversation using only audio. As a result, the user can avoid an undesirable partner visually recognizing his/her own video.

(4) The communication device may be configured to be connectable to a video input device and an audio input device, the first conversation operation may include an operation for transmitting video data input by the video input device and audio data input by the audio input device to the other device by the communicator while receiving audio data transmitted from the other device by the communicator, and the second conversation operation may include an operation for not transmitting video data to the other device but transmitting the audio data input by the audio input device to the other device by the communicator while receiving audio data transmitted from the other device by the communicator.

In this case, the user can talk with the user of the other device while making the user of the other device visually recognize his/her own video by the first conversation operation. The user can talk with the user of the other device without making the user of the other device visually recognizing his/her own video by the second conversation operation.

(5) According to the embodiment of the present invention, a communication device configured to be capable of communicating with another device and be operable using an operating member by a user while being connectable to a video output device includes a main functional unit configured to perform a main functional operation based on video data and audio data, a communicator configured to be capable of transmitting video data and audio data to the other device and receiving video data, audio data, and a conversation request transmitted from the other device, and a controller configured to control the main functional unit while controlling communication of video data and audio data by the communicator, a power supplier configured to be capable of supplying power to the controller and the main functional unit, and a switcher configured to switch the communication device to a power-on state where power is supplied to the controller and the main functional unit from the power supplier and a standby state where power is supplied to the controller from the power supplier and power is not supplied to the main functional unit, in which the controller configured to selectively perform a first conversation operation for transmitting audio data and video data to the other device by the communicator and a second conversation operation for transmitting audio data to the other device by the communicator and not transmitting video data to the other device while being configured to selectably display a first index corresponding to the first conversation operation and a second index corresponding to the second conversation operation on a screen of the video output device, and the controller is further configured to determine whether the communication device is in the power-on state or the standby state, determine whether the first index or the second index is selected on the screen when the communication device is in the power-on state and the communicator receives the conversation request from the other device, perform the first conversation operation when the first index is selected, perform the second conversation operation when the second index is selected, determine whether the operating member is operated when the communication device is in the standby state and the communicator receives the conversation request from the other device, and perform the second conversation operation when the operating member is operated.

The switcher switches the communication device to the power-on state and the standby state. In the power-on state, power is supplied to the controller and the main functional unit from the power supplier. In the standby state, power is not supplied to the main functional unit. If the communication device is in the power-on state, the controller controls the main functional unit, and the main functional unit performs the main functional operation based on video data and audio data. The first index corresponding to the first conversation operation and the second index corresponding to the second conversation operation are selectably displayed on the screen of the video output device. The controller determines whether the communication device is in the power-on state or the standby state.

If the communication device is in the power-on state and the conversation request from the other device is received, the controller determines whether the first index or the second index is selected on the screen. If the first index is selected, the controller performs the first conversation operation. If the second index is selected, the controller performs the second conversation operation. If the communication device is in the power-on state, therefore, the user can start a conversation using both video and audio or a conversation using only audio while viewing the screen by selecting the first index or the second index displayed on the screen of the video output device on the screen.

Even if the communication device is in the standby state, the user may be in the vicinity of the communication device. If the communication device is in the standby state and the communicator receives the conversation request from the other device, the controller determines whether the operating member is operated. If the operating member is operated, the controller performs the second conversation operation. Thus, the user can start the conversation using only audio simply and immediately without switching the communication device to the power-on state. In this case, the conversation using both video and audio can be prevented from being started by erroneous selection.

Thus, the user can start the conversation using both video and audio or the conversation using only audio in a desired method depending on the situation. As a result, convenience for the user is improved.

(6) The operating member may be provided in a remote controller for controlling the communication device. In this case, the user can cause the controller to perform the second conversation operation simply and immediately without erroneously selecting the first conversation operation by a remote operation using the remote controller.

(7) The controller may be configured to further determine whether the operating member is operated when the communication device is in the power-on state and the communicator receives the conversation request from the other device, and perform the second conversation operation when the operating member is operated.

In this case, if the communication device is in the power-on state and the conversation request from the other device is received, the controller performs the second conversation operation when the operating member is operated. If the communication device is in the power-on state, therefore, the user can start the conversation using only audio simply and immediately while preventing the conversation using both video and audio from being started by erroneous selection.

(8) The controller may be configured to selectably display a third index corresponding to the first conversation operation on the screen of the video output device while performing the second conversation operation, and switch the second conversation operation to the first conversation operation when the third index is selected.

In this case, the user can select the third index at desired timing while the second conversation operation is performed. Thus, the user can start the conversation using both video and audio after confirming the user of the other device by the conversation using only audio. As a result, the user can avoid an undesirable partner visually recognizing his/her own video.

(9) The communication device may be configured to be connectable to a video input device and an audio input device, the first conversation operation may include an operation for transmitting video data input by the video input device and audio data input by the audio input device to the other device by the communicator while receiving audio data transmitted from the other device by the communicator, and the second conversation operation may include an operation for not transmitting video data to the other device but transmitting the audio data input by the audio input device to the other device by the communicator while receiving audio data transmitted from the other device by the communicator.

In this case, the user can talk with the user of the other device while making the user of the other device visually recognize his/her own video by the first conversation operation. The user can talk with the user of the other device without making the user of the other device visually recognize his/her own video by the second conversation operation.

(10) According to the embodiment of the present invention, a communication method for a communication device configured to be capable of communicating with another device and be operable using an operating member by a user while being connectable to a video output device includes the steps of receiving a conversation request from the other device by a communicator, selectably displaying a first index corresponding to a first conversation operation for transmitting audio data and video data to the other device and a second index corresponding to a second conversation operation for transmitting audio data to the other device and not transmitting video data to the other device on a screen of the video output device, determining whether the first index or the second index is selected on the screen and whether the operating member is operated when the conversation request is received, and performing the first conversation operation when the first index is selected, performing the second conversation operation when the second index is selected, and performing the second conversation operation when the operating member is operated.

In the communication method, the first index corresponding to the first conversation operation and the second index corresponding to the second conversation operation are selectably displayed on the screen of the video output device. When the communicator receives the conversation request from the other device, the controller determines whether the first index or the second index is selected on the screen and whether the operating member is operated. If the first index is selected, the first conversation operation is performed. If the second index is selected, the second conversation operation is performed. If the operating member is operated, the second conversation operation is performed.

The user can start a conversation using both video and audio or a conversation using only audio while viewing the screen by selecting the first index or the second index displayed on the screen of the video output device on the screen. The user can start the conversation using only audio simply and immediately by operating the operating member. In this case, the conversation using both video and audio can be prevented from being started by erroneous selection. Thus, the user can start the conversation using both video and audio or the conversation using only audio in a desired method depending on the situation. As a result, convenience for the user is improved.

(11) According to the embodiment of the present invention, a communication method for a communication device configured to be capable of communicating with another device and be operable using an operating member by a user while being connectable to a video output device, in which the communication device is configured to be switchable to a power-on state where power is supplied to a controller and a main functional unit and a standby state where power is supplied to the controller and power is not supplied to the main functional unit, includes the steps of performing a main functional operation based on video data and audio data by the main functional unit according to control by the controller when the communication device is in the power-on state, receiving a conversation request from the other device by a communicator, selectably displaying a first index corresponding to a first conversation operation for transmitting audio data and video data to the other device and a second index corresponding to a second conversation operation for transmitting audio data to the other device and not transmitting video data to the other device on a screen of the video output device, determining whether the communication device is in the power-on state or the standby state, determining whether the first index or the second index is selected on the screen when the communication device is in the power-on state and the communicator receives the conversation request from the other device, performing the first conversation operation when the first index is selected, and performing the second conversation operation when the second index is selected, determining whether the operating member is operated when the communication device is in the standby state and the communicator receives the conversation request from the other device, and performing the second conversation operation when the operating member is operated.

The communication device is switchable to the power-on state and the standby state. In the power-on state, power is supplied to the controller and the main functional unit from the power supplier. In the standby state, power is not supplied to the main functional unit. If the communication device is in the power-on state, the controller controls the main functional unit, and the main functional unit performs the main functional operation based on video data and audio data. The first index corresponding to the first conversation operation and the second index corresponding to the second conversation operation are selectably displayed on the screen of the video output device. It is determined whether the communication device is in the power-on state or the standby state.

If the communication device is in the power-on state and the conversation request from the other device is received, it is determined whether the first index or the second index is selected on the screen. If the first index is selected, the first conversation operation is performed. If the second index is selected, the second conversation operation is performed. If the communication device is in the power-on state, therefore, the user can start a conversation using both video and audio or a conversation using only audio while viewing the screen by selecting the first index or the second index displayed on the screen of the video output device on the screen.

Even if the communication device is in the standby state, the user may be in the vicinity of the communication device. If the communication device is in the standby state and the communicator receives the conversation request from the other device, it is determined whether the operating member is operated. If the operating member is operated, the second conversation operation is performed. Thus, the user can start the conversation using only audio simply and immediately without switching the communication device to the power-on state. In this case, the conversation using both video and audio can be prevented from being started by erroneous selection.

Thus, the user can start the conversation using both video and audio or the conversation using only audio in a desired method depending on the situation. As a result, convenience for the user is improved.

(12) According to the embodiment of the present invention, a communication program executable by a controller in a communication device configured to be capable of communicating with another device and be operable using an operating member by a user while being connectable to a video output device causes the controller to perform processing for controlling a communicator to receive a conversation request from the other device, processing for selectably displaying a first index corresponding to a first conversation operation for transmitting audio data and video data to the other device and a second index corresponding to a second conversation operation for transmitting audio data to the other device and not transmitting video data to the other device on a screen of the video output device, processing for determining whether the first index or the second index is selected on the screen and whether the operating member is operated when the conversation request is received, and processing for performing the first conversation operation when the first index is selected, performing the second conversation operation when the second index is selected, and perform the second conversation operation when the operating member is operated.

According to the communication program, the first index corresponding to the first conversation operation and the second index corresponding to the second conversation operation are selectably displayed on the screen of the video output device. When the communicator receives the conversation request from the other device, it is determined whether the first index or the second index is selected on the screen and whether the operating member is operated. If the first index is selected, the first conversation operation is performed. If the second index is selected, the second conversation operation is performed. If the operating member is operated, the second conversation operation is performed.

The user can start a conversation using both video and audio or a conversation using only audio while viewing the screen by selecting the first index or the second index displayed on the screen of the video output device on the screen. The user can start the conversation using only audio simply and immediately by operating the operating member. In this case, the conversation using both video and audio can be prevented from being started by erroneous selection.

Thus, the user can start the conversation using both video and audio or the conversation using only audio in a desired method depending on the situation. As a result, convenience for the user is improved.

(13) According to the embodiment of the present invention, a communication program executable by a controller in a communication device configured to be capable of communicating with another device and be operable using an operating member by a user while being connectable to a video output device, in which the communication device is configured to be switchable to a power-on state where power is supplied to the controller and a main functional unit and a standby state where power is supplied to the controller and power is not supplied to the main functional unit, causes the controller to perform processing for controlling the main functional unit to perform a main functional operation based on video data and audio data when the communication device is in the power-on state, processing for controlling a communicator to receive a conversation request from the other device, processing for selectably displaying a first index corresponding to a first conversation operation for transmitting audio data and video data to the other device and a second index corresponding to a second conversation operation for transmitting audio data to the other device and not transmitting video data to the other device on a screen of the video output device, processing for determining whether the communication device is in the power-on state or the standby state, processing for determining whether the first index or the second index is selected on the screen when the communication device is in the power-on state and the communicator receives the conversation request from the other device, processing for performing the first conversation operation when the first index is selected, and performing the second conversation operation when the second index is selected, processing for determining whether the operating member is operated when the communication device is in the standby state and the communicator receives the conversation request from the other device, and processing for performing the second conversation operation when the operating member is operated.

The communication device is switchable to the power-on state and the standby state. In the power-on state, power is supplied to the controller and the main functional unit from the power supplier. In the standby state, power is not supplied to the main functional unit. If the communication device is in the power-on state, the controller controls the main functional unit, and the main functional unit performs the main functional operation based on video data and audio data. The first index corresponding to the first conversation operation and the second index corresponding to the second conversation operation are selectably displayed on the screen of the video output device. It is determined whether the communication device is in the power-on state or the standby state.

If the communication device is in the power-on state and the conversation request from the other device is received, it is determined whether the first index or the second index is selected on the screen. If the first index is selected, the first conversation operation is performed. If the second index is selected, the second conversation operation is performed. If the communication device is in the power-on state, therefore, the user can start a conversation using both video and audio or a conversation using only audio while viewing the screen by selecting the first index or the second index displayed on the screen of the video output device on the screen.

Even if the communication device is in the standby state, the user may be in the vicinity of the communication device. If the communication device is in the standby state and the communicator receives the conversation request from the other device, it is determined whether the operating member is operated. If the operating member is operated, the second conversation operation is performed. Thus, the user can start the conversation using only audio simply and immediately without switching the communication device to the power-on state. In this case, the conversation using both video and audio can be prevented from being started by erroneous selection.

Thus, the user can start the conversation using both video and audio or the conversation using only audio in a desired method depending on the situation. As a result, convenience for the user is improved.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. A communication device configured to communicate with another device and to operate using an operating member by a user, the operating member including a first operating member and a second operating member that is different from the first operating member, the communication device comprising:
   a communicator configured to transmit video data and audio data to the other device and receive video data, audio data, and a conversation request transmitted from the other device; and
   a controller configured to selectively perform a first conversation operation and a second conversation operation, the first conversation operation transmitting audio data and video data to the other device by said communicator, the second conversation operation transmitting audio data to the other device by said communicator and not transmitting video data to the other device, while selectably displaying a first index and a second index on a screen, the first index corresponding to the first conversation operation and the second index corresponding to the second conversation operation, wherein
   the first operating member is operable by the user to select one of the first index and the second index,
   the second operating member is operable by the user and is associated with the second conversation operation,
   said controller is configured to determine whether the first index or the second index is selected on the screen by an operation of the first operating member and whether the second operating member is operated, when said communicator receives the conversation request from the other device, and
   said controller is further configured to perform the first conversation operation when the first index is selected, to perform the second conversation operation when the second index is selected, and to perform the second conversation operation when the second operating member is operated.

2. The communication device according to claim 1, wherein
   the operating member is provided in a remote controller that controls said communication device.

3. The communication device according to claim 1, wherein
   said controller is configured to selectably display a third index corresponding to the first conversation operation on the screen while performing the second conversation operation, and switch the second conversation operation to the first conversation operation when the third index is selected.

4. The communication device according to claim 1, wherein
   said communication device is connectable to a video input device and an audio input device,
   the first conversation operation transmits video data input by the video input device and audio data input by the audio input device to the other device by the communicator while receiving audio data transmitted from the other device by said communicator, and the second conversation operation does not transmit video data to the other device, and transmits the audio data input by the audio input device to the other device by said communicator while receiving audio data transmitted from the other device by said communicator.

5. A communication device configured to communicate with another device and to operate using an operating member by a user, the operating member including a first operating member and a second operating member that is different from the first operating member, the communication device comprising:

a main functional processor configured to perform a main functional operation based on video data and audio data;

a communicator configured to transmit video data and audio data to the other device and receive video data, audio data, and a conversation request transmitted from the other device;

a controller configured to control said main functional processor while controlling communication of video data and audio data by said communicator;

a power supplier configured to supply power to said controller and said main functional processor; and a switch configured to switch said communication device to a power-on state, in which power is supplied to said controller and said main functional processor from said power supplier, and to a standby state in which power is supplied to said controller from said power supplier and power is not supplied to said main functional processor, wherein said controller is configured to selectively perform a first conversation operation and a second conversation operation, the first conversation operation transmitting audio data and video data to the other device by said communicator, the second conversation operation transmitting audio data to the other device by said communicator and not transmitting video data to the other device, while selectably displaying a first index and a second index on a screen, the first index corresponding to the first conversation operation, the second index corresponding to the second conversation operation, the first operating member is operable by the user to select one of the first index and the second index, the second operating member is operable by the user and is associated with the second conversation operation, said controller is further configured to determine whether said communication device is in the power-on state or the standby state, and to determine whether the first index or the second index is selected on the screen by an operation of the first operating member, when said communication device is in the power-on state and said communicator receives the conversation request from the other device, perform the first conversation operation when the first index is selected, and perform the second conversation operation when the second index is selected, said controller is further configured to determine whether the second operating member is operated when said communication device is in the standby state and said communicator receives the conversation request from the other device, and perform the second conversation operation when the second operating member is operated.

6. The communication device according to claim 5, wherein the operating member is provided in a remote controller that controls said communication device.

7. The communication device according to claim 5, wherein said controller is configured to further determine whether the second operating member is operated when said communication device is in the power-on state and said communicator receives the conversation request from the other device, and perform the second conversation operation when the second operating member is operated.

8. The communication device according to claim 5, wherein said controller is configured to selectably display a third index corresponding to the first conversation operation on the screen while performing the second conversation operation, and switch the second conversation operation to the first conversation operation when the third index is selected.

9. The communication device according to claim 5, wherein said communication device is connectable to a video input device and an audio input device, the first conversation operation transmits video data input by the video input device and audio data input by the audio input device to the other device by said communicator while receiving audio data transmitted from the other device by said communicator, and the second conversation operation does not transmit video data to the other device, and transmits the audio data input by the audio input device to the other device by said communicator while receiving audio data transmitted from the other device by said communicator.

10. A communication method for a communication device, which is configured to communicate with another device and to operate using an operating member by a user, the operating member including a first operating member and a second operating member that is different from the first operating member, the communication method comprising:

receiving a conversation request from the other device by a communicator;

selectably displaying a first index corresponding to a first conversation operation and a second index corresponding to a second conversation operation on a screen, the first conversation operation transmitting audio data and video data to the other device, the second conversation operation transmitting audio data to the other device and not transmitting video data to the other device, the first operating member being operable by the user to select one of the first index and the second index, the second operating member being operable by the user and being associated with the second conversation operation;

determining whether the first index or the second index is selected on the screen by an operation of the first operating member and whether the second operating member is operated when the conversation request is received; and performing the first conversation operation when the first index is selected, performing the second conversation operation when the second index is selected, and performing the second conversation operation when the second operating member is operated.

11. A communication method for a communication device, which is configured to communicate with another device and to operate using an operating member by a user, the operating member including a first operating member and a second operating member that is different from the first operating member, wherein the communication device is switchable to a power-on state in which power is supplied to a controller and a main functional processor and a standby state in which power is supplied to the controller and power is not supplied to the main functional processor, the communication method comprising:

performing a main functional operation based on video data and audio data by the main functional processor according to control by the controller when the communication device is in the power-on state;

receiving a conversation request from the other device by a communicator;

selectably displaying a first index corresponding to a first conversation operation and a second index corresponding to a second conversation operation on a screen, the first conversation operation transmitting audio data and video data to the other device, the second conversation operation transmitting audio data to the other device and not transmitting video data to the other device, the first operating member being operable by the user to select one of the first index and the second index, the second operating member being operable by the user and being associated with the second conversation operation;

determining whether the communication device is in the power-on state or the standby state;

determining whether the first index or the second index is selected on the screen by an operation of the first operating member, when the communication device is in the power-on state and the communicator receives the conversation request from the other device;

performing the first conversation operation when the first index is selected, and performing the second conversation operation when the second index is selected;

determining whether the second operating member is operated when the communication device is in the standby state and the communicator receives the conversation request from the other device; and performing the second conversation operation when the second operating member is operated.

12. A non-transitory computer readable recording medium storing a communication program executable by a controller, the controller comprising a processor, in a communication device, which is configured to communicate with another device and to operate using an operating member by a user, the operating member including a first operating member and a second operating member that is different from the first operating member, the communication program causing the processor to perform operations including:

controlling a communicator to receive a conversation request from the other device;

selectably displaying a first index corresponding to a first conversation operation and a second index corresponding to a second conversation operation on a screen, the first conversation operation transmitting audio data and video data to the other device, the second conversation operation transmitting audio data to the other device and not transmitting video data to the other device, the first operating member being operable by the user to select one of the first index and the second index, the second operating member being operable by the user and being associated with the second conversation operation;

determining whether the first index or the second index is selected on the screen by an operation of the first operating member and whether the second operating member is operated when the conversation request is received; and performing the first conversation operation when the first index is selected, performing the second conversation operation when the second index is selected, and performing the second conversation operation when the second operating member is operated.

13. A non-transitory computer readable recording medium storing a communication program executable by a controller, the controller comprising a processor, in a communication device, which is configured to communicate with another device and to operate using an operating member by a user, the operating member including a first operating member and a second operating member that is different from the first operating member, wherein the communication device is switchable to a power-on state in which power is supplied to the controller and a main functional processor and a standby state in which power is supplied to the controller and power is not supplied to the main functional processor, the communication program causing the processor to perform operations including:

controlling the main functional processor to perform a main functional operation based on video data and audio data when the communication device is in the power-on state;

controlling a communicator to receive a conversation request from the other device;

selectably displaying a first index corresponding to a first conversation operation and a second index corresponding to a second conversation operation on a screen, the first conversation operation transmitting audio data and video data to the other device, the second conversation operation transmitting audio data to the other device and not transmitting video data to the other device, the first operating member being operable by the user to select one of the first index and the second index, the second operating member being operable by the user and being associated with the second conversation operation;

determining whether the communication device is in the power-on state or the standby state;

determining whether the first index or the second index is selected on the screen by an operation of the first operating member, when the communication device is in the power-on state and the communicator receives the conversation request from the other device;

performing the first conversation operation when the first index is selected, and performing the second conversation operation when the second index is selected;

determining whether the second operating member is operated when the communication device is in the standby state and the communicator receives the conversation request from the other device; and performing the second conversation operation when the second operating member is operated.

* * * * *